United States Patent
Anquet et al.

(10) Patent No.: US 11,700,174 B2
(45) Date of Patent: Jul. 11, 2023

(54) METHOD FOR MANAGING THE OPERATION OF A SYSTEM ON CHIP, AND CORRESPONDING SYSTEM ON CHIP

(71) Applicants: STMicroelectronics (Alps) SAS, Grenoble (FR); STMicroelectronics (Grand Ouest) SAS, Le Mans (FR)

(72) Inventors: Nicolas Anquet, Grenoble (FR); Loic Pallardy, Pouillon (FR)

(73) Assignees: STMICROELECTRONICS (GRAND OUEST) SAS, Le Mans (FR); STMICROELECTRONICS (ALPS) SAS, Grenoble (FR)

( * ) Notice: Subject to any disclaimer, the term of this patent is extended or adjusted under 35 U.S.C. 154(b) by 77 days.

(21) Appl. No.: 16/951,198

(22) Filed: Nov. 18, 2020

(65) Prior Publication Data
US 2021/0160134 A1    May 27, 2021

(30) Foreign Application Priority Data
Nov. 22, 2019 (FR) ...................... 1913124

(51) Int. Cl.
*H04L 41/0803* (2022.01)
*H04L 41/0813* (2022.01)
(Continued)

(52) U.S. Cl.
CPC ........ *H04L 41/0813* (2013.01); *G06F 15/177* (2013.01); *G06F 15/17306* (2013.01);
(Continued)

(58) Field of Classification Search
CPC ..... H04L 1/0813; H04L 49/109; H04L 9/109; H04L 41/0803; H04L 29/08072; H04L 29/06; G06F 17/306; G06F 15/177
(Continued)

(56) References Cited

U.S. PATENT DOCUMENTS 6,546,496 B1    4/2003  Wang et al.
9,091,727 B1    7/2015  Lupu et al.
(Continued)

FOREIGN PATENT DOCUMENTS

BR    112013025855 A2 * 12/2016 ........... G06F 1/3284
EP           2621136 A2      7/2013
(Continued)

OTHER PUBLICATIONS

Gerstlauer, A., "EE382V System-on-a-Chip (SoC) Design," Lecture 12—SoC Communication Architectures, University of Texas at Austin, © 2014 A. Gerstlauer, 43 pages.
(Continued)

*Primary Examiner* — Khanh Q Dinh
(74) *Attorney, Agent, or Firm* — Slater Matsl, LLP

(57) ABSTRACT

System on a chip, comprising several master pieces of equipment, several slave resources, an interconnection circuit capable of routing transactions between master pieces of equipment and slave resources, and a processing unit at least configured to allow a user of the system on a chip to implement within the system on a chip at least one configuration diagram of this system defined by a set of configuration pieces of information including at least one piece of identification information assigned to each master piece of equipment, The identification pieces of information are intended to be attached to all the transactions emitted by the corresponding master pieces of equipment, the set of configuration pieces of information not being used for addressing the slave resources receiving the transactions and being used to define an assignment of at least one piece of master equipment to at least some of the slave resources.

28 Claims, 15 Drawing Sheets

(51) Int. Cl.
  *H04L 49/109* (2022.01)
  *G06F 15/173* (2006.01)
  *G06F 15/177* (2006.01)
  *G06F 21/85* (2013.01)

(52) U.S. Cl.
  CPC ........ *H04L 41/0803* (2013.01); *H04L 49/109* (2013.01); *G06F 21/85* (2013.01)

(58) Field of Classification Search
  USPC ............... 709/220, 224, 226, 228, 227, 225
  See application file for complete search history.

(56) References Cited

U.S. PATENT DOCUMENTS

| | | | |
|---|---|---|---|
| 9,143,392 B2* | 9/2015 | Duchesneau | H04L 63/20 |
| 9,703,944 B2 | 7/2017 | Hopkins et al. | |
| 9,946,674 B2 | 4/2018 | Mayer et al. | |
| 10,176,131 B1 | 1/2019 | Arbel | |
| 10,372,883 B2* | 8/2019 | Hurst | G06Q 50/184 |
| 10,983,937 B2 | 4/2021 | Ferrand et al. | |
| 11,050,570 B1* | 6/2021 | Totah | H04L 9/3215 |
| 11,088,876 B1* | 8/2021 | Farjadrad | H04L 25/0298 |
| 11,112,418 B1* | 9/2021 | Holmes | G01N 35/04 |
| 11,144,235 B1* | 10/2021 | Lyons | G06F 3/0673 |
| 11,175,839 B1* | 11/2021 | Volpe | G06F 3/0679 |
| 11,182,110 B1* | 11/2021 | Ansari | G06F 5/06 |
| 11,308,573 B2* | 4/2022 | Nystad | G06F 9/54 |
| 2003/0108030 A1* | 6/2003 | Gao | H04L 45/306 370/351 |
| 2005/0235281 A1* | 10/2005 | Lefrancois | G06F 8/60 717/175 |
| 2006/0193273 A1 | 8/2006 | Passier et al. | |
| 2007/0116023 A1* | 5/2007 | Tatapudi | H04L 49/109 370/403 |
| 2007/0182445 A1* | 8/2007 | Chen | G06F 30/34 326/39 |
| 2008/0123423 A1 | 5/2008 | Kim | |
| 2008/0183305 A1* | 7/2008 | Foster | G06F 21/85 700/3 |
| 2008/0204089 A1 | 8/2008 | Nakasha | |
| 2009/0324764 A1* | 12/2009 | Sekihara | B29C 45/1744 425/161 |
| 2010/0067507 A1 | 3/2010 | Park | |
| 2011/0016310 A1* | 1/2011 | Yong | G06F 21/72 713/155 |
| 2012/0030730 A1* | 2/2012 | Smith | G06F 21/57 726/2 |
| 2012/0079590 A1 | 3/2012 | Sastry et al. | |
| 2012/0239895 A1 | 9/2012 | Zbiciak et al. | |
| 2012/0266230 A1* | 10/2012 | Vanderpol | G06F 21/85 726/22 |
| 2013/0059576 A1 | 3/2013 | Park et al. | |
| 2013/0151829 A1* | 6/2013 | Amann | G06F 12/00 713/2 |
| 2015/0113100 A1* | 4/2015 | Tweedale | H04L 41/0816 709/219 |
| 2016/0019180 A1 | 1/2016 | Liu et al. | |
| 2019/0179645 A1 | 6/2019 | Prasad | |
| 2019/0303328 A1 | 10/2019 | Balski et al. | |
| 2021/0157668 A1 | 5/2021 | Pallardy et al. | |
| 2021/0160193 A1 | 5/2021 | Olson et al. | |

FOREIGN PATENT DOCUMENTS

| | | |
|---|---|---|
| FR | 3003054 | 9/2014 |
| WO | 2016099812 A1 | 6/2016 |

OTHER PUBLICATIONS

Venkateswara Rao, M., et al., "A Frame work on AMBA bus based Communication Architecture to improve the Real Time Computing Performance in MPSoC," International Journal of Computer Applications (0975-8887), Apr. 2014, 5 pages, vol. 91, No. 5.

"Octo-SPI Interface on STM32 Microcontrollers," AN5050, Revision 7, Application Note, STMicroelectronics, Sep. 2021, 74 pages.

"SPC58EHx/SPC58NHx OctalSPI IO Manager," TN1365, Technical Note, STMicroelectronics, Jun. 2021, 8 pages.

* cited by examiner

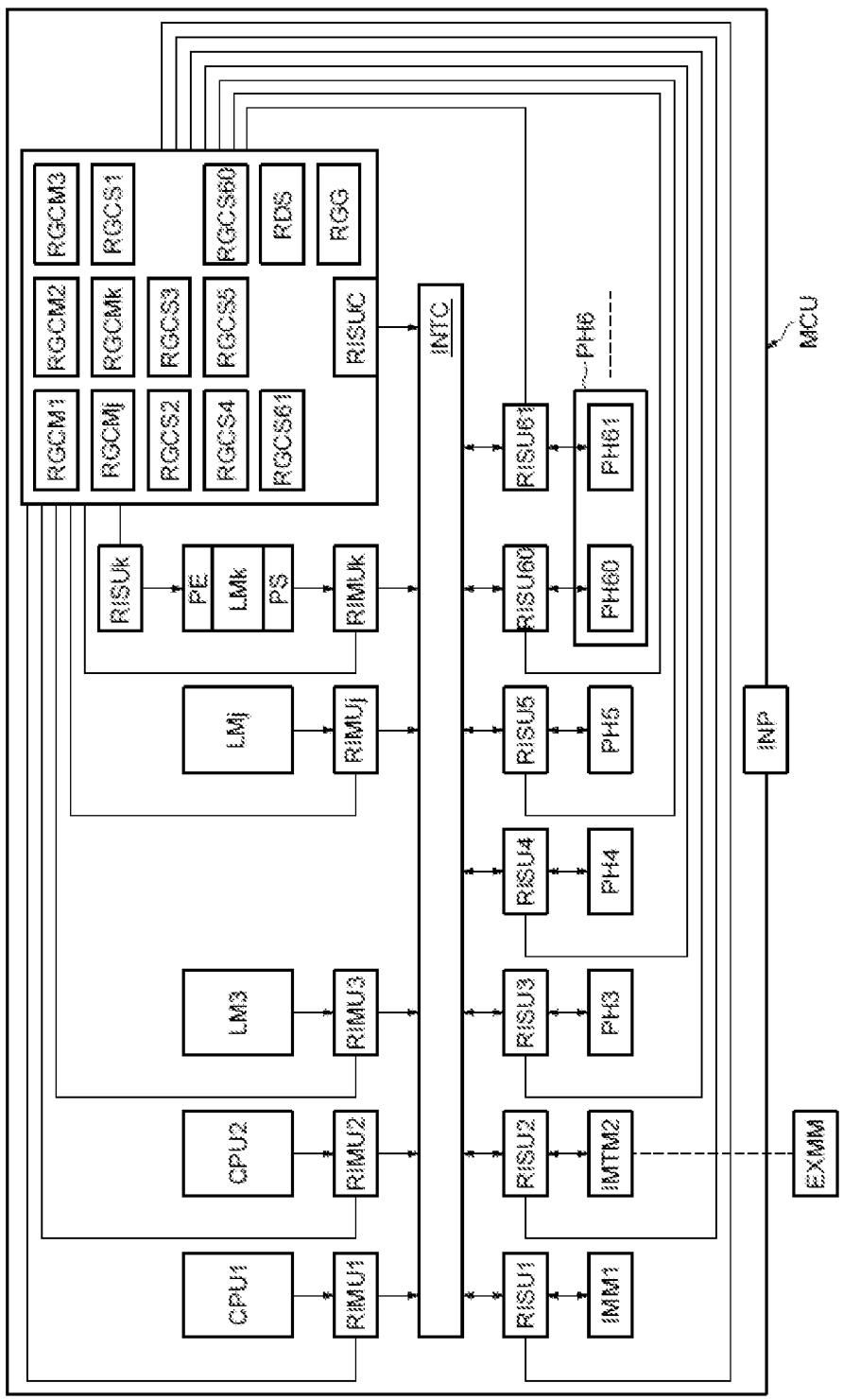
[Fig 1]

[Fig 2]
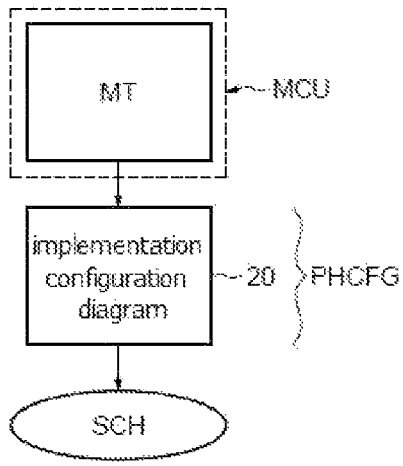
[Fig 3]
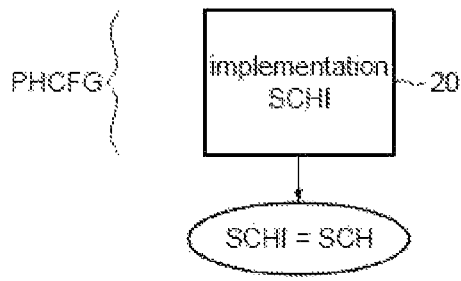
[Fig 4]
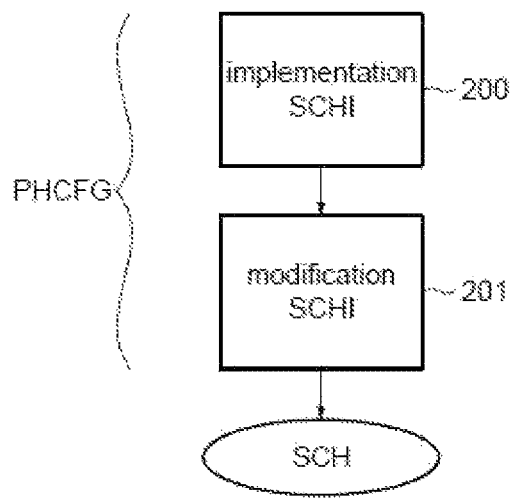

[Fig 5]
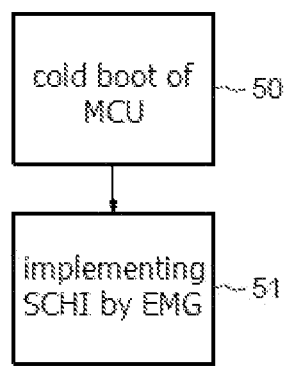
[Fig 6]
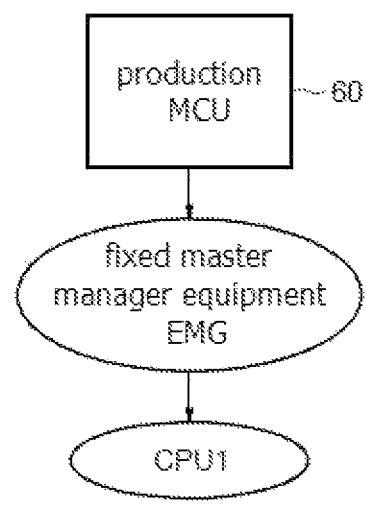

[Fig 7]
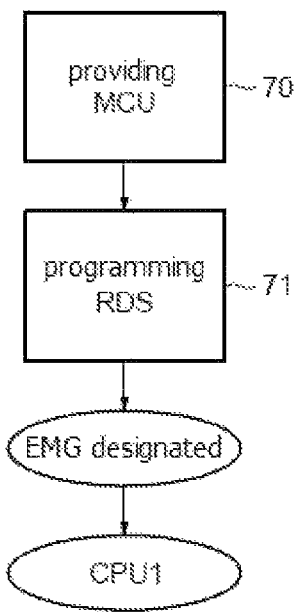
[Fig 8]
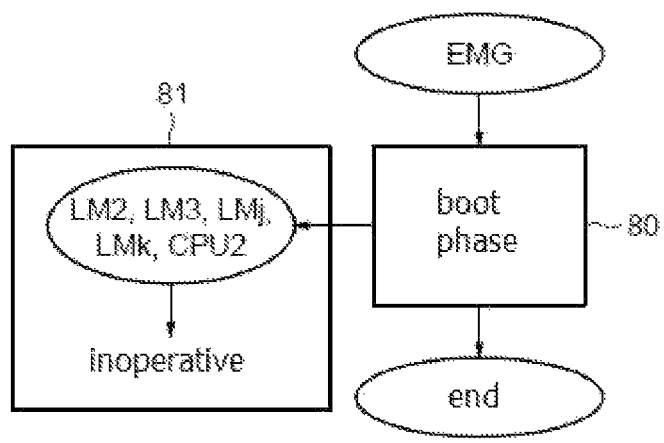

[Fig 9]
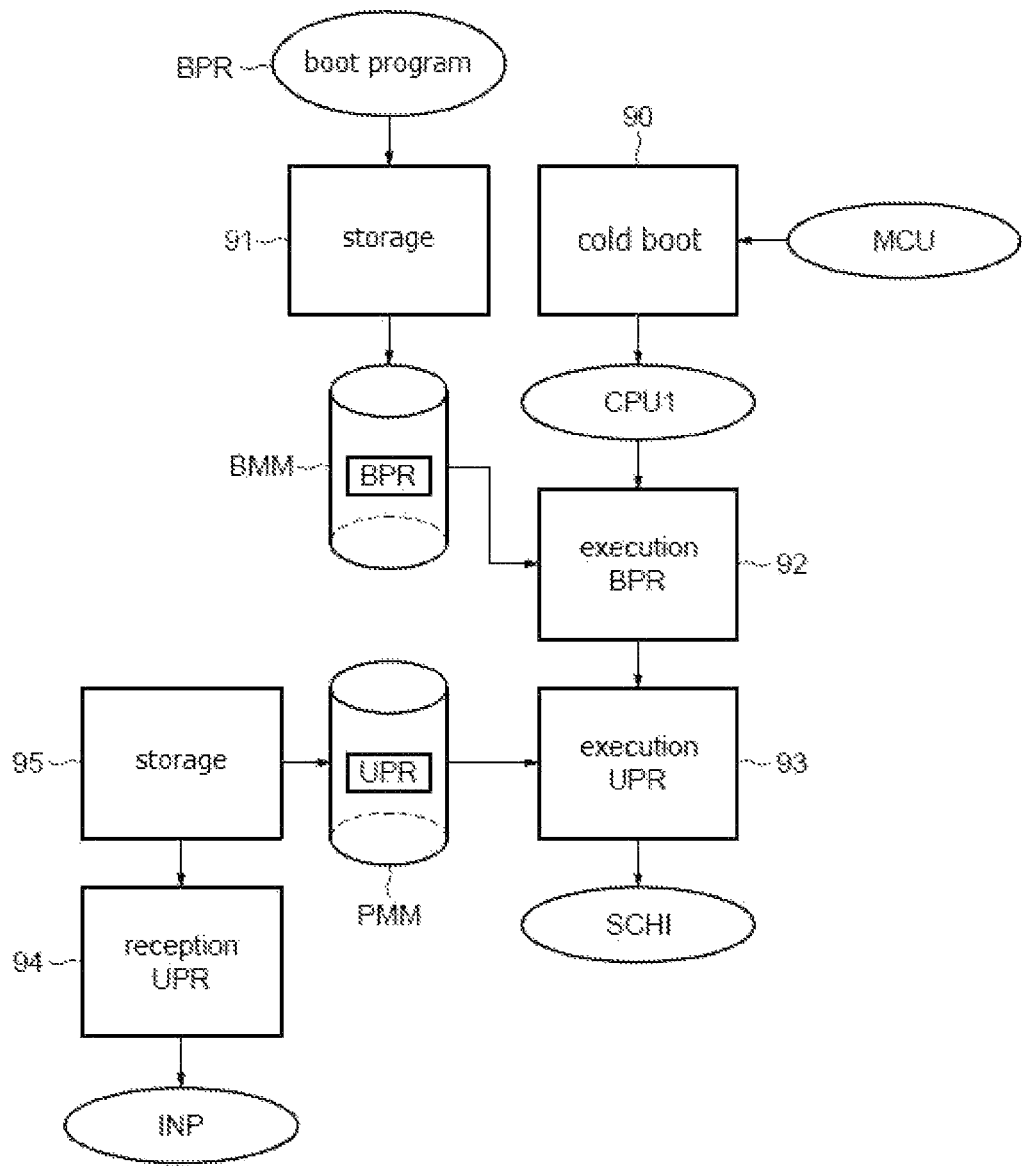

[Fig 10]
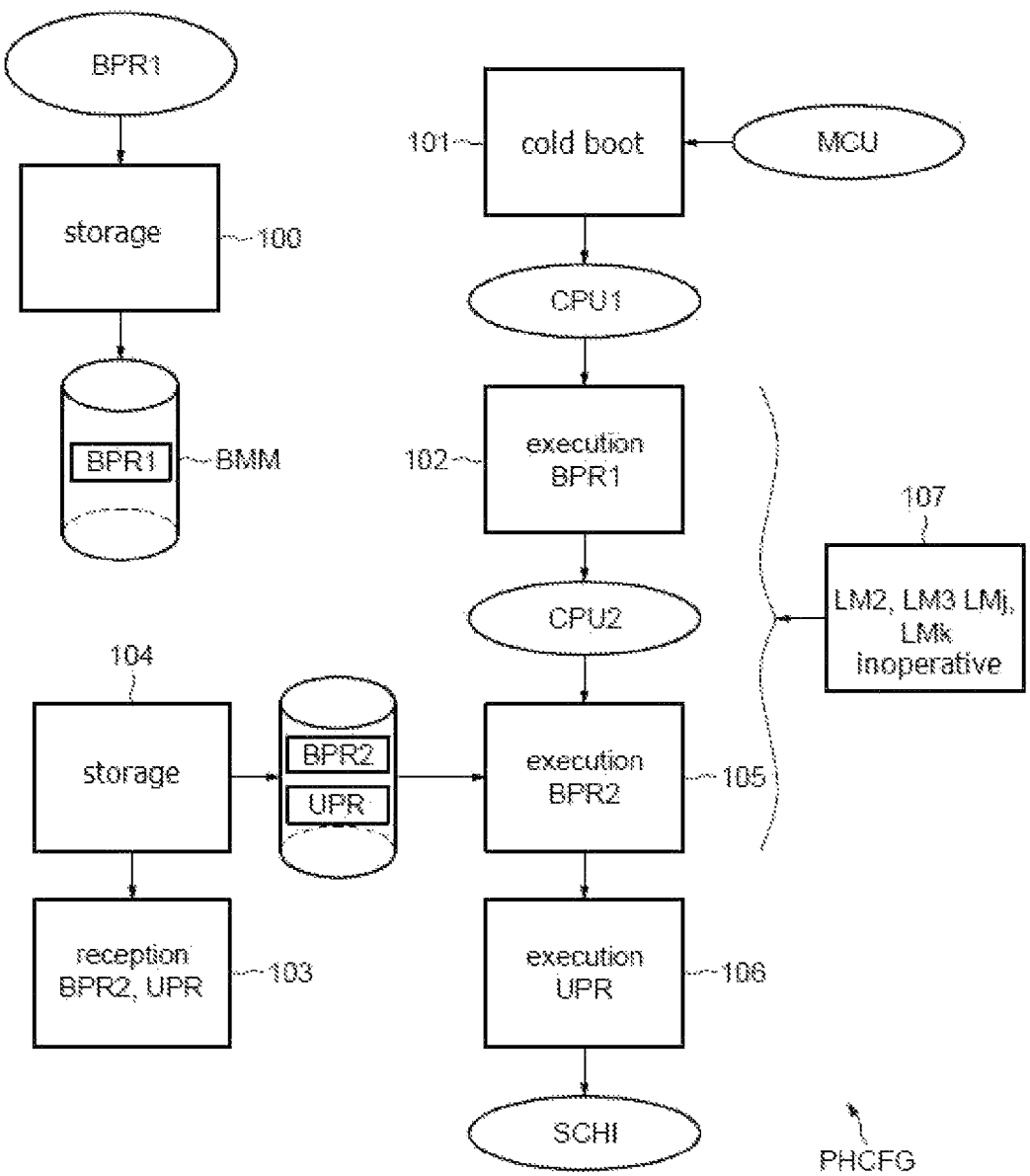

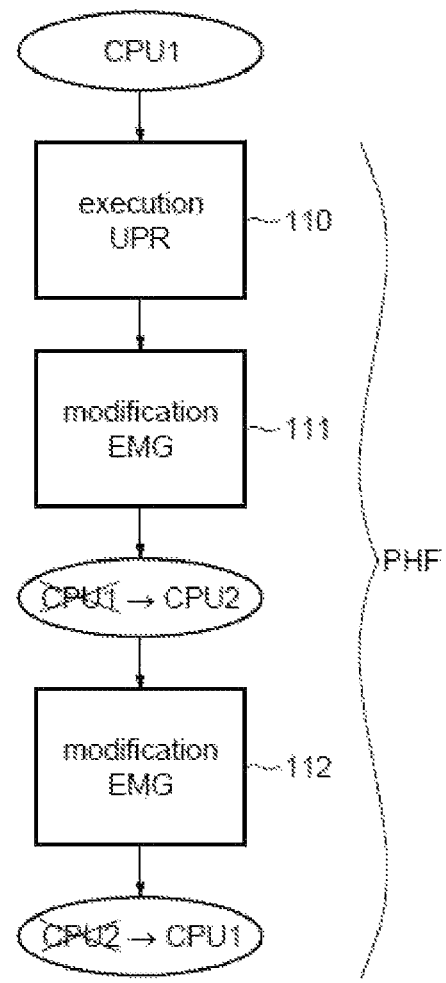

[Fig 12]
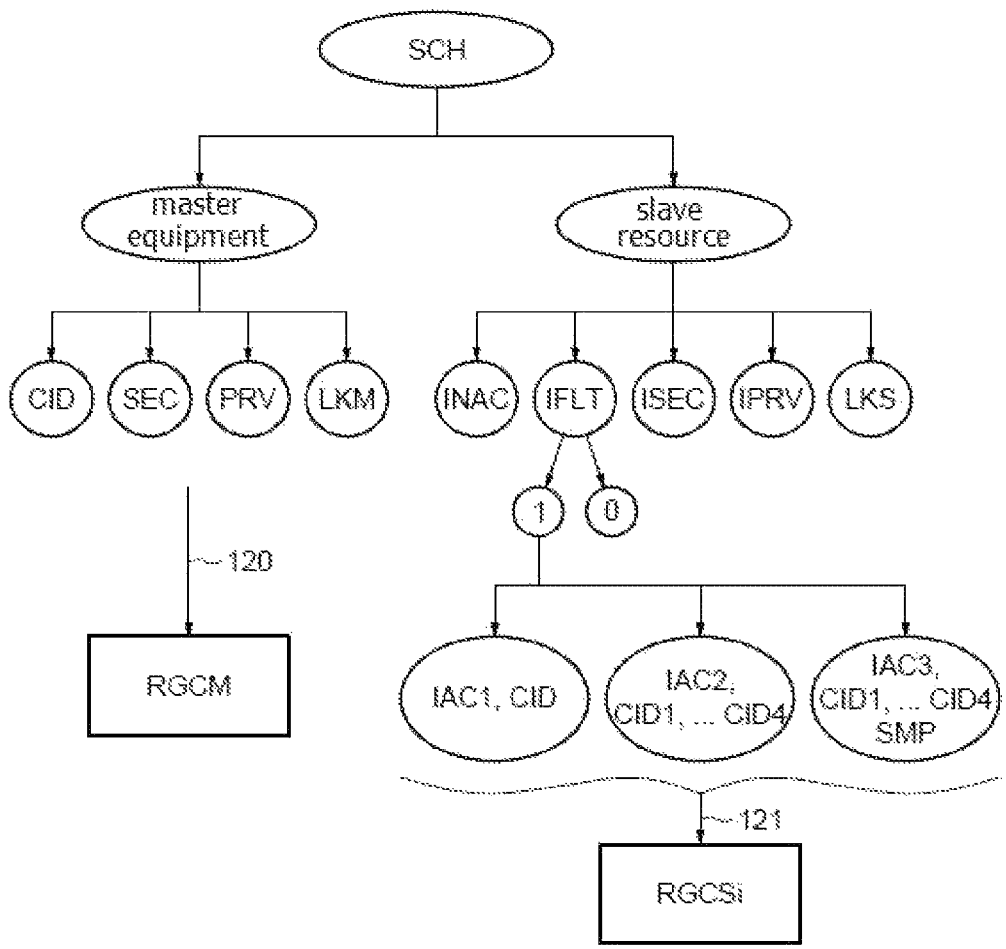
[Fig 13]
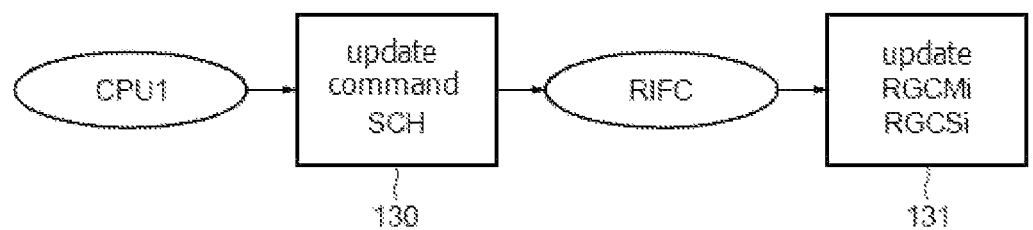

[Fig 14]
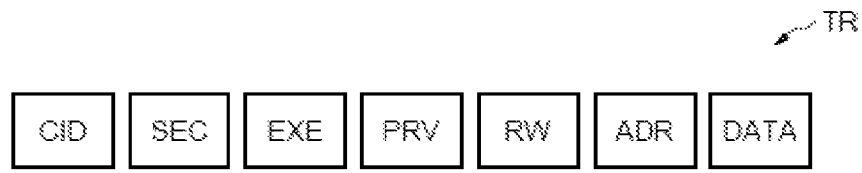
[Fig 15]
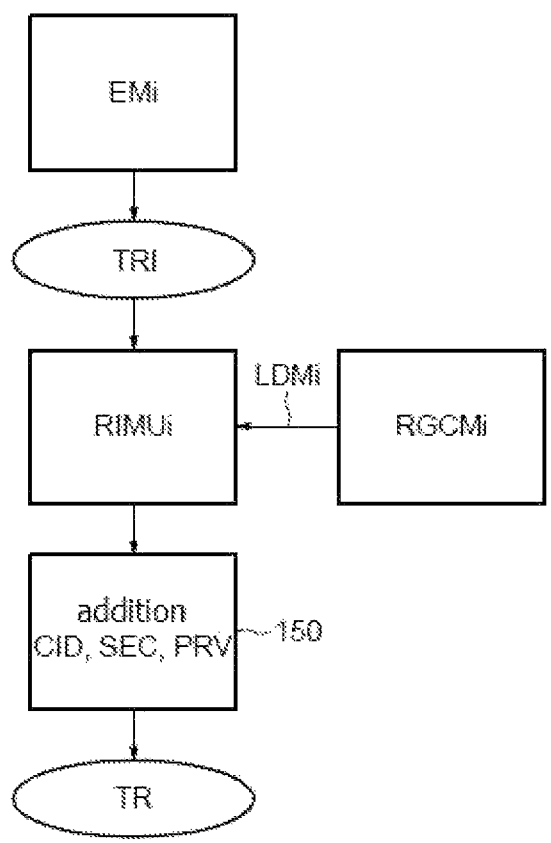

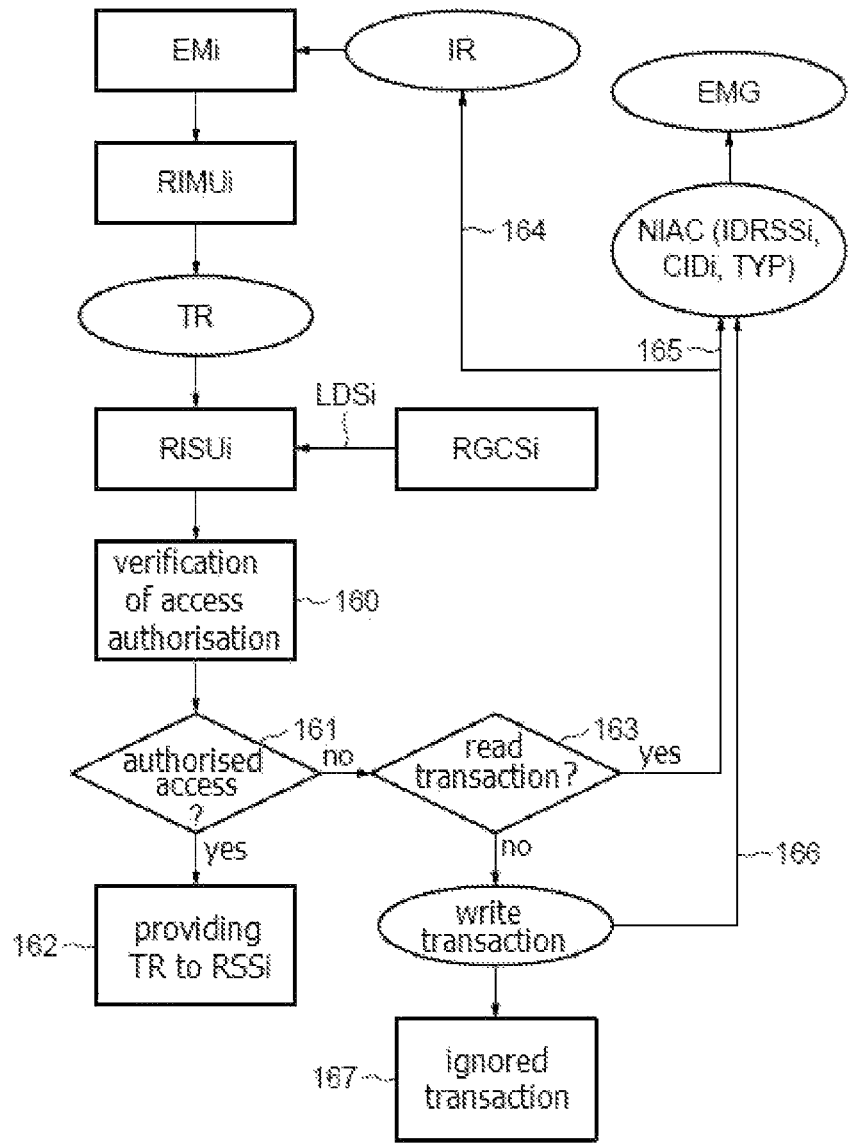
[Fig 16]

[Fig 17]
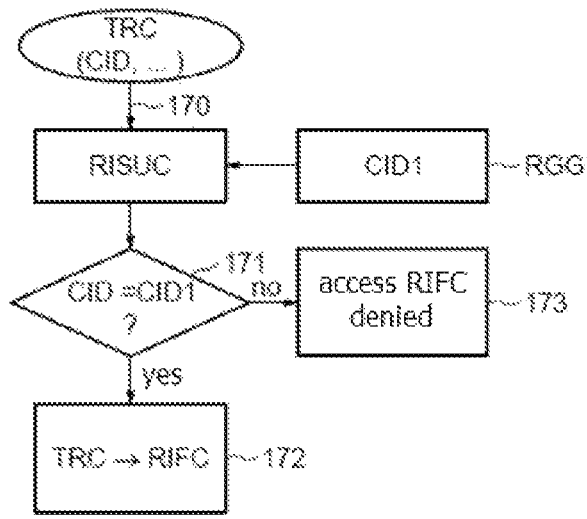
[Fig 18]
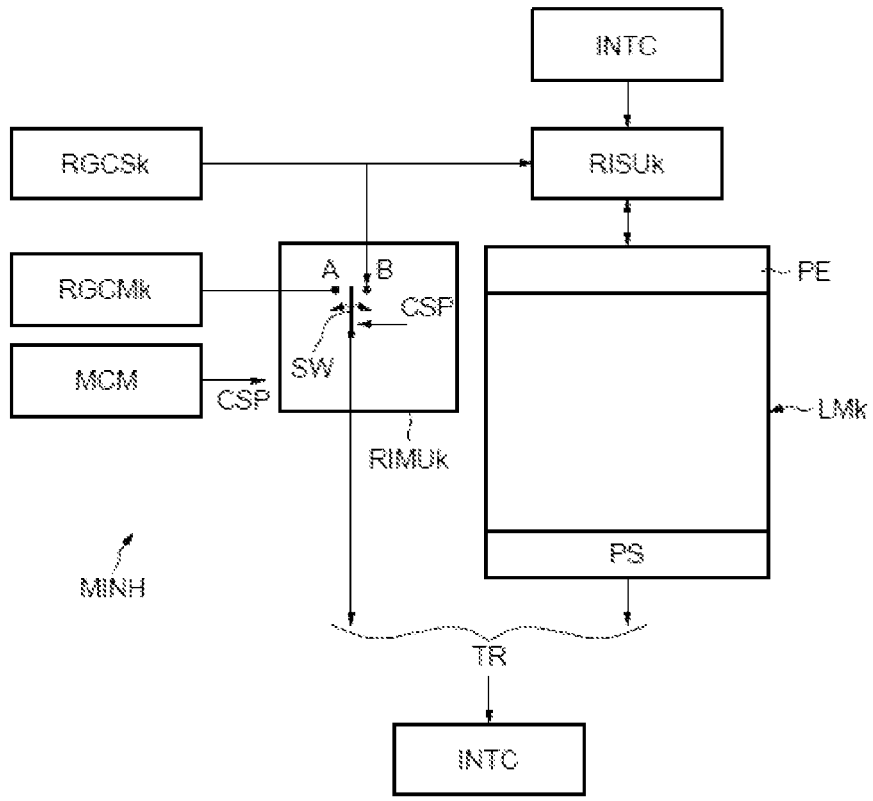

[Fig 19]
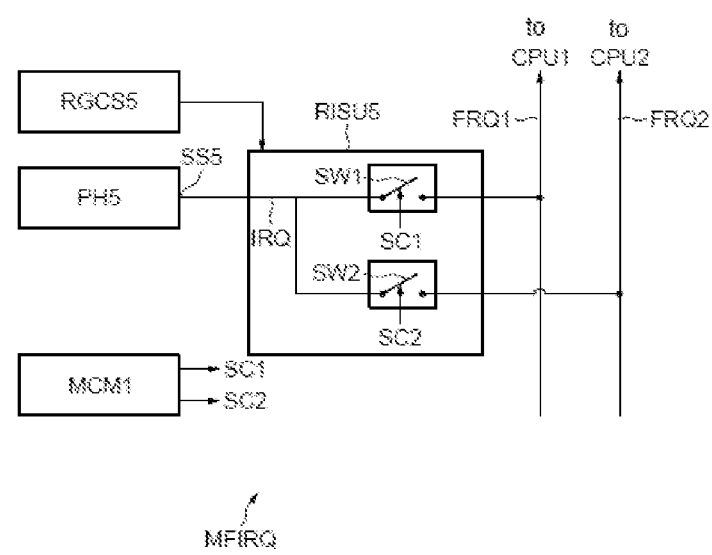

[Fig 20]
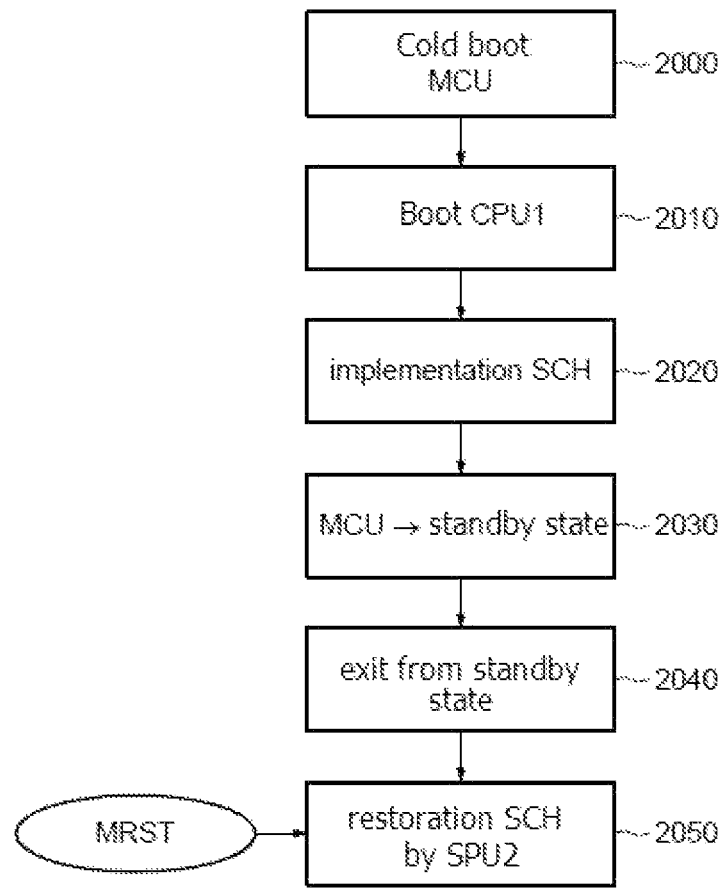
[Fig 21]
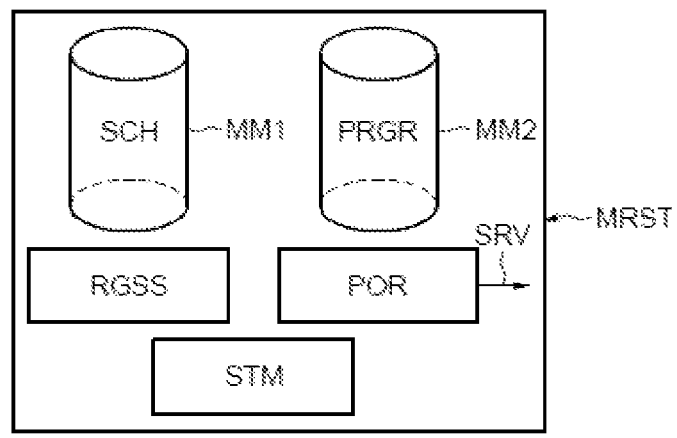

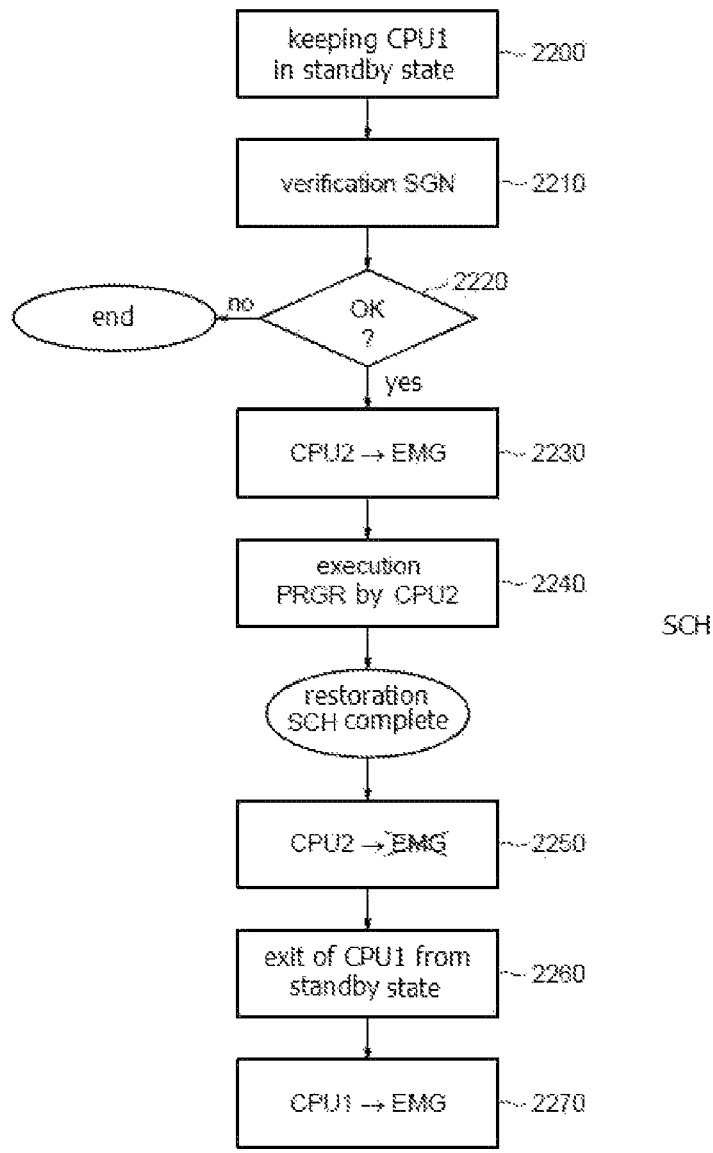
[Fig 22]

[Fig 23]
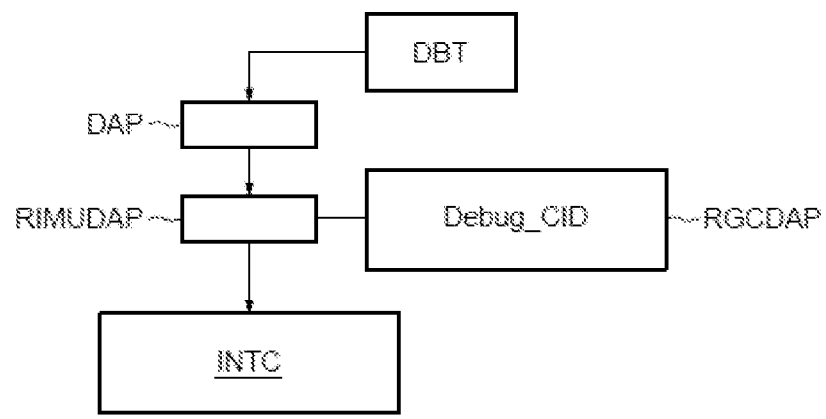
[Fig 24]
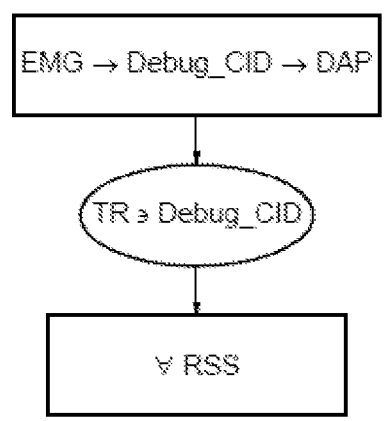

METHOD FOR MANAGING THE OPERATION OF A SYSTEM ON CHIP, AND CORRESPONDING SYSTEM ON CHIP

CROSS-REFERENCE TO RELATED APPLICATIONS

This application claims the benefit of French Application No. 1913124, filed on Nov. 22, 2019, which application is hereby incorporated herein by reference.

TECHNICAL FIELD

Embodiments of the invention relate to integrated circuits, in particular systems on a chip (SoC), for example a (multi-core or single-core) microcontroller, or a microprocessor, and more particularly the management of the operation of such a system on a chip.

BACKGROUND

In order to help ensure the reliability of a system on a chip, it may be necessary to restrict the access of one or more master pieces of equipment to specific slave resources. Such a feature is designated by the person skilled in the art under the term "isolation."

There is a need to make management of these access restrictions simple to carry out and to implement, particularly in the case where this management is dynamic, for example when it depends on the applications considered for the system on a chip, for example of the applications considered on the multiple cores of the chip.

There is also a need to provide a system on a chip, for example a microcontroller or a microprocessor, allowing all the cases of use emanating from the various users of the system on a chip as well as all the configurations in a flexible manner, and particularly including a low power mode.

SUMMARY

According to one aspect, a system on a chip comprising several master pieces of equipment is proposed, for example, when the system particularly forms a microcontroller, at least one microprocessor and generally several microprocessors, a direct memory access controller (DMA: Direct Memory Access) without these examples being limiting.

The system on a chip moreover includes several slave resources.

By way of non-limiting example, a slave resource can belong to the group formed by at least one peripheral, for example a peripheral of the I²C ("Inter Integrated Circuit") type, of the SPI ("Serial Peripheral Interface) type, of the UART ("Universal Asynchronous Receiver Transmitter) type, or else a Real Time Clock (RTC), a feature of a peripheral, for example an alarm line of the RTC peripheral, a memory means internal to the system on a chip, a memory interface internal to the system on a chip and intended to be coupled to a memory means external to the system on a chip, for example a DDR ("Double Data Rate") type memory.

The system on a chip moreover includes an interconnection system (known by the person skilled in the art under the name "interconnect") coupled between the master pieces of equipment and the slave resources and capable of routing transactions (for example write or read transactions) between the master pieces of equipment and the slave resources.

The system on a chip moreover includes processing means at least configured to allow a user of the system on a chip to implement within the system on a chip at least one configuration diagram of this system on a chip, this configuration diagram being defined by a set of configuration pieces of information including at least one piece of identification information assigned to each master piece of equipment.

These identification pieces of information are intended to be attached to all the transactions emitted by the corresponding master pieces of equipment.

They are particularly used to designate the corresponding master pieces of equipment.

Moreover, the set of these configuration pieces of information, and particularly the identification pieces of information, is not used for addressing the slave resources receiving the transactions but is used to define an assignment of at least one piece of master equipment to at least some of the slave resources, or else an assignment of at least some of the slave resources to at least one piece of master equipment.

Moreover, addressing the slave resources receiving the transactions is performed by means of an addressing field contained in the considered transaction. And not only the set of configuration pieces of information is not used for addressing the slave resources receiving the transactions, but also, the content of the addressing field of a transaction is not used to define the assignment of at least one piece of master equipment to at least some of the slave resources.

Thus, assigning one or more master pieces of equipment to one or more slave resources allows to manage the isolation architecture of the different slave resources and the different master pieces of equipment in a very simple and flexible manner by this set of configuration pieces of information.

It is quite possible, in a very simple case, that the set of configuration pieces of information includes only the identification pieces of information assigned to the master pieces of equipment. And then it can be seen that these identification pieces of information alone allow easily managing and defining the system on a chip isolation architecture.

However, as will be seen in more detail below, the set of configuration pieces of information can generally include other configuration pieces of information than the identification piece of information, which will allow refining the isolation architecture, with greater flexibility.

According to one embodiment, the master pieces of equipment can include several microprocessors and master pieces of equipment controllable by these microprocessors.

Moreover, the same identification pieces of information as the identification piece of information of the microprocessor can be assigned to at least some of the master pieces of equipment controllable by a microprocessor.

This allows to define a group or compartment of master pieces of equipment identified by the same identification piece of information. And, the master pieces of equipment of the same compartment can for example have access to identical memory resources.

However, it is also possible that a master piece of equipment controllable by a microprocessor is assigned an identification piece of information different from the identification piece of information of the microprocessor.

This can for example be the case of a master piece of equipment of the PCI express (PCI-E) type to which one does not wish to give access to some memory areas which can also be accessed by the microprocessor.

It is also possible that at least one piece of master equipment controllable by a microprocessor includes an output port capable of emitting transactions as well as an input port capable of receiving transactions. The input port is then considered as a slave resource and the output port as a master piece of equipment.

Such master piece of equipment having an input port and an output port can be for example a USB controller or else an SD card controller.

The processing means are advantageously configured to allow a user of the system on a chip to implement within the system on a chip an initial configuration diagram forming the configuration diagram.

In such a case, in fact the context of a static configuration is considered, wherein the configuration diagram corresponds to an initial implemented configuration diagram which does not undergo any modification during the operation of the system on a chip.

Alternatively, it is quite possible that the processing means are configured to allow a user of the system on a chip to implement within the system on a chip an initial configuration diagram having an initial set of configuration pieces of information, the processing means then also being configured to modify the value of at least one piece of configuration information of this initial set so as to obtain the set of configuration pieces of information defining the configuration diagram.

In other words, in this "dynamic" case, the user has the possibility, after having implemented the initial configuration diagram, of modifying this initial configuration diagram later.

Whether in a static configuration case or in a dynamic configuration case, the processing means advantageously comprise installation means including, from the master pieces of equipment, a first master piece of equipment called master manager piece of equipment, this first master manager piece of equipment being configured, in response to a first boot or cold boot of the system on a chip, to perform a boot phase at the end of which this first master manager piece of equipment is configured to at least allow the implementation of the initial configuration diagram.

This first master manager piece of equipment may comprise a microprocessor or, alternatively, a hardware logic circuit.

Moreover, the designation of the first master manager piece of equipment can be fixed during the production of the system on a chip.

In other words, the system on a chip once produced, will impose by construction a first master manager piece of equipment from the master pieces of equipment of the system on a chip.

Alternatively, to allow greater flexibility, it is possible that the installation means include a programmable designation register, allowing to designate the first master manager piece of equipment.

This programmable register can be formed for example of several OTP ("One Time Programmable") memories allowing the user of the system on a chip, according to its application, to designate by programming these OTP memories, one of the master pieces of equipment as first master manager piece of equipment.

In particular, so as not to generate a conflict during the configuration phase of the system on a chip, the installation means are further advantageously configured to temporarily make all the other master pieces of equipment inoperative as long as the first master manager piece of equipment has not completed its boot phase.

For example, temporarily making a master piece of equipment such as a microprocessor inoperative can be performed by forcing the reset signal to zero, which allows to keep the microprocessor in standby state.

According to one embodiment, the installation means further include a boot memory configured to store a boot program executable only by the first master manager piece of equipment during the first boot (cold boot) of the system on a chip.

In a general manner, the processing means preferably include configuration means configured to allow a user of the system on a chip to define the initial configuration diagram and allocation means configured to implement the initial configuration diagram.

In this regard, the configuration means for example include an input configured to receive a user program containing at least instructions representative of the initial configuration diagram, as well as a program memory intended for storing the user program.

For example, the allocation means, in turn, include the first master manager piece of equipment which is configured, at the end of its boot phase, to execute the user program in order to implement the initial configuration diagram.

Therefore, the user can very simply software define the initial configuration diagram for the system on a chip and it is the first master manager piece of equipment which, at the end of its boot phase, will execute the user program in order to implement the initial configuration diagram.

The embodiment providing a master manager piece of equipment which is the only one authorized to implement the initial configuration diagram and to modify it, if necessary, can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system, the processing means comprising installation means including from the master pieces of equipment a first master piece of equipment called master manager piece of equipment, this first master manager piece of equipment being configured to allow the implementation of the configuration diagram.

As indicated above, this configuration diagram can be an initial configuration diagram or else an initial configuration diagram modified by the first master manager piece of equipment.

This first master manager piece of equipment can also be configured to modify the configuration diagram so as to implement a new configuration diagram which may possibly be modified again by the master manager piece of equipment.

In the foregoing, it has been considered that there was only one master manager piece of equipment operating in response to the first boot of the system on a chip.

However, it is possible, alternatively, that there is a handover between an initial master piece of equipment and another master piece of equipment designated as being a new master manager piece of equipment.

More specifically, and according to one embodiment, the installation means then include, from the master pieces of equipment, a master piece of equipment called "initial manager equipment," configured, during the first boot (or cold boot) of the system on a chip, to perform a boot phase at the end of which it is configured to authorize a boot of another master piece of equipment designated as being a new master manager piece of equipment, this new master manager piece of equipment then forming the first master manager piece of equipment, this first master manager piece of equipment being configured, at the end of its boot phase, to allow the implementation of the initial configuration diagram.

Such an embodiment is for example advantageous when the initial master manager piece of equipment is defined by default during the production of the system on a chip and the user wishes during the configuration phase, taking into account its application, to modify the master manager piece of equipment.

In such a variant embodiment (change of master manager piece of equipment), the initial master manager piece of equipment can comprise a microprocessor and the new master manager piece of equipment can comprise another microprocessor.

It is also possible that the initial master manager piece of equipment comprises a hardware logic circuit and that the new master manager piece of equipment comprises a microprocessor.

Again, the installation means are further advantageously configured to temporarily make all the other master pieces of equipment inoperative as long as the boot phase of the initial master manager piece of equipment and that of the new master manager piece of equipment are not completed.

Still in the case of this variant embodiment (change of master manager piece of equipment), the installation means may include a boot memory configured to store a boot program executable only by the initial master manager piece of equipment during the first boot (cold boot) of the system on a chip and a programmable memory configured to store the boot program of the new master manager piece of equipment.

Still in the case of this variant embodiment with change of master manager piece of equipment, the configuration means can again include an input configured to receive a user program containing at least instructions representative of the initial configuration diagram, this program memory also being intended to store the user program and the allocation means again include the first master manager piece of equipment configured, at the end of its boot phase, to execute the user program in order to implement the initial configuration diagram.

Regardless of the variant embodiment which has just been exposed (change or not of the master manager piece of equipment during the configuration phase of the system on a chip), it is also possible for the user to change the master manager piece of equipment during the actual operation phase of the system on a chip (that is to say during the execution of its user program).

More specifically, with this in mind, the first master manager piece of equipment (which is the one which is effectively manager at the end of the configuration phase of the system on a chip) is further configured, after having allowed the initial configuration diagram to be implemented, to designate, during the execution of a user program by the processing means, a second master piece of equipment as new master manager piece of equipment, the first master piece of equipment then being configured to lose its quality as master manager piece of equipment.

As will be seen in more detail below, it is possible to provide a register called manager register, intended to contain the identification piece of information of the current master manager piece of equipment. And, designating another master piece of equipment as master manager piece of equipment by the current master manager piece of equipment, can then advantageously be performed by writing in this manager register, by the current master manager piece of equipment, the identification piece of information of the new master piece of equipment which will then be the master manager piece of equipment. And, since the manager register no longer includes the identification piece of information of the previous master manager piece of equipment, the latter has de facto lost its quality as master manager piece of equipment.

Moreover, it is quite possible, in some cases, to provide that it is possible to change the master manager piece of equipment several times during the execution of the user program.

Such a change can be decided during the operation of the system on a chip, or else be fixed during the manufacture of the system on a chip.

The number of changes can also be fixed.

In other words, and according to one embodiment, any new master manager piece of equipment can be in turn configured to designate a new master manager piece of equipment and then lose its quality as master manager piece of equipment.

The embodiment providing for a handover of master manager piece of equipment can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system, the processing means comprising installation means including from the master pieces of equipment a master piece of equipment called master manager piece of equipment, this master manager piece of equipment being configured to allow the implementation of the configuration diagram and being capable of designating a new manager equipment thereby losing its quality of master manager piece of equipment.

Now the set of configuration pieces of information defining the configuration diagram will be more detailed.

As previously seen, in a very simple case, it is possible that this set contains only the identification pieces of information of the master pieces of equipment.

However, other configuration pieces of information can complete this set.

Thus, according to one embodiment, the set of configuration pieces of information defining the configuration diagram may further comprise for at least one slave resource, an inaccessibility piece of information intended to indicate that this slave resource is inaccessible by any master piece of equipment.

It is indeed quite possible that in some applications, the user decides that a slave resource should absolutely not be used by any master piece of equipment.

According to yet another embodiment, the set of configuration pieces of information defining the configuration diagram may further comprise for each non-inaccessible slave resource, a filtering piece of information intended to indicate, based only on the identification pieces of information of the master pieces of equipment, whether this slave resource can be accessed by any master piece of equipment or by only one or more master pieces of equipment.

In other words, with this filtering piece of information, it is possible to enable or disable the filtering on the identification pieces of information of the master pieces of equipment. Thus, if filtering is enabled, then this means that the slave resource can be accessed by only one or more master pieces of equipment.

If filtering is disabled, this means that the slave resource can be accessed by any master piece of equipment, therefore, regardless of the identification piece of information attached to the transaction, but of course provided that other access restrictions will not be applied as will be seen in more detail below.

In other words, if no other access restriction is applied and filtering is disabled, then the slave resource can be accessed by any master piece of equipment.

In the event that this filtering is enabled, several other configuration pieces of information are then advantageously provided.

Thus, the set of configuration pieces of information defining a configuration diagram can thereby comprise, for each non-inaccessible slave resource, a first access piece of information, intended to indicate, in the case where the filtering piece of information indicates that the slave resource can be accessed by only one or more master pieces of equipment, that this slave resource can be accessed by one or more master pieces of equipment having the same identification piece of information.

In other words, in this case, the slave resource can only be accessed by a transaction including only this identification piece of information.

And of course, the set of configuration pieces of information includes these corresponding identification pieces of information.

Still in the case where the filtering piece of information indicates that the slave resource can be accessed by only one or more master pieces of equipment, the set of configuration pieces of information defining the configuration diagram can then further comprise, for each non-inaccessible slave resource, a second access piece of information intended to indicate that this slave resource can be accessed by master pieces of equipment having different identification pieces of information.

This can be the case for example for an internal memory means or for the memory interface intended to be coupled to an external memory means for example.

And, in this case, the set of configuration pieces of information comprises of course the list of identification pieces of information of the corresponding master pieces of equipment.

However, even if some slave resources can be accessed by master pieces of equipment having different identification pieces of information, it is also possible that, from these slave resources, at least one of them cannot be accessed simultaneously by several master pieces of equipment, particularly in order to avoid conflicts.

Therefore, it is advantageously provided that the set of configuration pieces of information defining the configuration diagram further comprises for at least one of the slave resources that can be accessed by the master pieces of equipment of the list, a third piece of information intended to indicate that the at least one of the slave resources can only be accessed by one master piece of equipment at a time, the master piece of equipment wishing to access this slave resource then being configured to use a semaphore.

In other words, the master piece of equipment of the list that wishes to access this slave resource must first "take" the semaphore before being able to access it. If the semaphore is not available, the master piece of equipment will not be able to access this slave resource and will have to wait for the semaphore to become available.

It is moreover particularly advantageous to define a secure mode and/or a privileged mode for the master pieces of equipment and the slave resources.

The concept of secure mode or privileged mode is well known to the person skilled in the art.

For example, for a processor in secure mode, dedicated Operating System (OS) can be used with resources that are not accessible in an unsecured mode.

In a privileged mode, the equipment can benefit from privileged rights for access to resources that will not have other equipment which are not in privileged mode.

Thus, according to one embodiment, the set of configuration pieces of information defining the configuration diagram may further comprise for each non-inaccessible slave resource, a security piece of information intended to indicate whether this slave resource is accessible by a master piece of equipment in secure mode or not.

The set of configuration pieces of information defining the configuration diagram may further comprise, for each non-inaccessible slave resource, a privileged piece of information intended to indicate whether this slave resource is accessible by a master piece of equipment in privileged mode or not.

In all of the above, the filtering concept and the set of configuration pieces of information apply to any slave resource, regardless of its nature.

Consequently, this applies particularly to peripherals.

It is therefore particularly possible to isolate a peripheral in a particular execution context for example for security and/or safety reasons.

But this also particularly applies to peripheral features.

As a result, it is therefore advantageously possible to particularly perform a filtering by peripheral feature.

And here again it is therefore particularly possible to isolate a feature within a peripheral in a particular execution context for example for security and/or safety reasons.

Moreover, the set of configuration pieces of information defining a configuration diagram may further comprise this time for each master piece of equipment, in addition to its identification piece of information, a security piece of information intended to indicate whether this master piece of equipment is configured in secure mode or not.

Likewise, the set of configuration pieces of information defining the configuration diagram may further comprise, for each master piece of equipment, in addition to its identification piece of information, a privileged piece of information intended to indicate whether this master piece of equipment is configured in privileged mode or not.

The first master manager piece of equipment is in turn preferably configured to be in secure mode and in privileged mode at the end of its boot phase.

Any slave resource can be read or write accessible.

However, this read or write access can be restricted according to the various configuration pieces of information set out above.

However, it is possible to define, for at least some of the slave resources, a piece of information called public access ("public read enable") piece of information allowing any master piece of equipment to have read access to this slave resource.

As seen above, it is possible to modify a configuration diagram by modifying at least one piece of configuration information. However, it is also possible that the set of configuration pieces of information defining the configuration diagram further comprises, for at least some of the slave resources and at least some of the master pieces of equipment, a locking piece of information intended to indicate whether their configuration pieces of information can be modified or not.

As indicated above, the allocation means comprise the first master manager piece of equipment.

However, the allocation means also comprise, according to one embodiment,
 a set of configuration registers assigned to each slave resource and to each master piece of equipment, and
 a configuration controller configured to update the contents of the sets of configuration registers with the set of configuration pieces of information under the control of the first master manager piece of equipment.

And, a set of configuration registers assigned to a slave resource is advantageously intended to store the various configuration pieces of information defined above and assigned to this slave resource.

Moreover, a set of configuration registers assigned to each master piece of equipment is intended to store the identification piece of information assigned to this master piece of equipment and the security and/or privileged type configuration piece of information defined above.

As indicated above, the processing means can be configured to use a user program to modify the initial configuration diagram after its implementation and to implement the configuration diagram accordingly and possibly modify again any old configuration diagram.

And, in this regard, only the master piece of equipment which has the quality of master manager piece of equipment is advantageously configured to modify a configuration diagram.

More specifically, and according to one embodiment, in order to modify a configuration diagram, the master manager piece of equipment is configured to control the configuration controller so that it updates the contents of the configuration registers with the set of configuration pieces of information defining the new configuration diagram to be implemented.

As regards now the transactions conveyed between the master pieces of equipment and the slave resources, each transaction emitted by a master piece of equipment comprises, according to one embodiment, an addressing field whose content is intended to address the slave resource receiving this transaction and the content of the addressing field does not belong to the set of configuration pieces of information.

Indeed, as indicated above, the content of the addressing field does not intervene in the definition of the configuration diagram.

According to one embodiment, the processing means further include addition means configured to add to each transaction emitted by a master piece of equipment, at least the identification piece of information of this master piece of equipment, this identification piece of information not belonging to the addressing field of the transaction.

The addition means are further advantageously configured to add to each transaction emitted by a master piece of equipment, the security piece of information and/or the privileged piece of information if these two pieces of information or one of the two pieces of information do not already appear in the transaction emitted by the master piece of equipment.

Indeed, some master pieces of equipment can already emit a transaction containing bits representative of their secure and/or privileged mode. And in this case, it is obviously not necessary for the addition means to carry out such an addition.

According to one embodiment, the addition means include, for each master piece of equipment, an elementary management unit configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Such a "decentralization" of the addition means into local units assigned to each master piece of equipment, allows greater homogeneity of implementation of the system on a chip and allows easily adding a master piece of equipment if necessary without having to modify the other elementary management units.

Each elementary management unit assigned to a master piece of equipment is preferably connected by a dedicated link at least to the set of configuration registers assigned to this master piece of equipment.

In other words, one does not use the communication buses of the interconnection circuit but uses a dedicated link, for example metal tracks of the integrated circuit.

This simplifies the production and programming of the system on a chip.

According to one embodiment, at least one piece of configuration information is intended to be attached to each transaction and the processing means include verification means configured to verify whether a transaction emanating from a master piece of equipment and intended for a slave resource is authorized to access this slave resource using the at least one piece of configuration information attached to the transaction.

Particularly, the verification means are configured to verify whether a transaction emanating from a master piece of equipment and intended for a slave resource is authorized to access this slave resource, using the at least one piece of configuration information attached to the transaction.

In this regard, the term "using" should be understood in a very broad sense. Indeed, even if the filtering piece of information is disabled (meaning that any master piece of equipment can access a slave resource, subject to other access restrictions) this filtering piece of information is based on the identification pieces of information and consequently the latter are used.

According to another embodiment, it is possible that the verification means are configured to verify whether a transaction emanating from a master piece of equipment and intended for a slave resource is authorized to access this slave resource using at least the security piece of information and the privileged piece information attached to the transaction.

Thus, it is possible, if for example the filtering piece of information is disabled, that the access to a slave resource is conditioned in secure/or privileged mode.

According to another embodiment, the verification means are configured to verify whether a transaction emanating from the master pieces of equipment and intended for a slave resource is authorized to access this slave resource using the configuration piece(s) of information attached to the transaction as well as at least some of the other configuration pieces of information of the set of configuration pieces of information, assigned to this slave resource.

The verification means are advantageously configured to perform the verification downstream of the interconnection circuit.

Indeed, performing a verification downstream of the interconnection circuit and not upstream again allows homogeneity of implementation and easily allows to add a slave resource in an easier manner or even to have a register or bit-exact granularity.

To complete this homogeneity of implementation and this ease of adding a slave resource if necessary, the verification means advantageously include, for each slave resource, an elementary verification module configured to access the set of configuration pieces of information assigned to this slave resource.

Here again, therefore, there is a decentralization of the verification means into localized modules.

Each elementary verification module assigned to a slave resource is again advantageously connected by a dedicated link to the set of configuration registers assigned to this other slave resource, for example by metal tracks.

As indicated above, the current manager equipment is identified by its identification piece of information contained in a manager register.

Therefore, according to one embodiment, the processing means also include an auxiliary verification module assigned to the controller, and configured to prohibit access to the controller to any master piece of equipment having an identification piece of information different from that contained in the manager register.

In the event that a read transaction emitted by a master piece of equipment and intended for a slave resource is not authorized to access this slave resource, the verification means are further configured to return to the master piece of equipment an indication of access denial (for example a bit having the logical value "o") and return to the master manager piece of equipment an illegal access notification containing an identifier of the slave resource, an indication of the type of access (here a read access) and the identification piece of information of the master piece of equipment at the origin of this denied transaction.

Moreover, in the event that a write transaction emitted by a master piece of equipment and intended for a slave resource is not authorized to access this slave resource, the verification means are configured to ignore this transaction and return to the master manager piece of equipment, also an illegal access notification containing an identifier of this slave resource, an indication of the type of access (here a write access) and the identification piece of information of the master piece of equipment at the origin of this denied transaction.

As seen above, it is possible that from the master pieces of equipment, there is at least one piece of master equipment having a slave port and a master port, for example a USB controller, with configuration pieces of information assigned to the slave port and configuration pieces of information assigned to the master port.

It is also possible that this master piece of equipment having a slave port and a master port is firstly controlled by a first microprocessor then secondly by a second microprocessor, the two microprocessors having different configuration pieces of information. And, it is advantageous that when a processor controls such a master piece of equipment, the configuration pieces of information of the input port are duplicated at the output port.

Thus, according to an advantageous embodiment, the processing means include inheritance means configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, when another microprocessor takes control of such a master piece of equipment, the inheritance means can allow by a simple switching, and if the inheritance rules allow it, to confer to the master port the configuration pieces of information of the slave port which correspond to those of the other microprocessor.

However, the inheritance rules prohibit, for example, defining a port for a peripheral in secure mode if the master piece of equipment which controls it is not itself in secure mode.

The embodiment providing inheritance means can be considered independently or else in combination with at least one of the preceding or following embodiments.

Thus when this embodiment is considered independently, according to another aspect a system on a chip is proposed, comprising several master pieces of equipment comprising from the master pieces of equipment, at least one piece of master equipment having a slave port and a master port, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system including configuration pieces of information.

According to this aspect, configuration pieces of information are assigned to the slave port and configuration pieces of information are assigned to the master port and the processing means include inheritance means configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, in more detail and according to a possible embodiment, the inheritance means include,
within the elementary management unit assigned to the master port, a set of controllable switches connected to at least some of the configuration registers assigned to the slave port and to the homologous configuration registers assigned to the master port, and
control means configured to control the set of switches so as to select either the corresponding configuration registers assigned to the master port or the corresponding configuration registers assigned to the slave port.

According to another embodiment, it is possible that the system on a chip comprises:
from the master pieces of equipment, several microprocessors,
from the slave resources, at least one slave resource configured to generate at least one interrupt signal intended for one of the microprocessors which is assigned to this slave resource, several interrupt wires respectively connected to the microprocessors and to the at least one slave resource and capable of conveying interrupt signals (these interrupt wires can of course be metal tracks).

In this case, the processing means advantageously comprise interrupt filtering means configured to route the interrupt signal emitted by the slave resource only on the interrupt wire connected to the microprocessor which is assigned thereto.

This advantageously allows to avoid to spy on the activity of the considered microprocessor by observing the interrupt signal.

The embodiment providing interrupt filtering means can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources.

According to this other aspect, the system on a chip comprises:
  from the master pieces of equipment, several microprocessors,
  from the slave resources, at least one slave resource configured to generate at least one interrupt signal intended for one of the microprocessors which is assigned to this slave resource,
  several interrupt wires respectively connected to the microprocessors and to the at least one slave resource and capable of conveying interrupt signals (these interrupt wires can of course be metal tracks), and
  interrupt filtering means configured to route the interrupt signal emitted by the slave resource only on the interrupt wire connected to the microprocessor which is assigned thereto.

The interrupt filtering means are advantageously incorporated at least in part into the elementary verification module assigned to the slave resource.

And, according to one embodiment, the interrupt filtering means include
  in the elementary verification module, several controllable switches connected between the output of the slave resource configured to provide the interrupt signal, and respectively the interrupt wires connected to the microprocessor, and
  control means configured to close the switch connected between the output and the interrupt wire connected to the microprocessor assigned to the slave resource, and to open the other switch/switches.

According to another embodiment, the system on a chip may comprise
  from the master pieces of equipment a first microprocessor configured to boot during a first boot of the system on a chip (cold boot) so as to allow the implementation of the configuration diagram, and a second master piece of equipment, for example a second microprocessor or a hardware state machine, and
  restore means configured to allow the second master piece of equipment to restore the configuration diagram instead of the first microprocessor in the event of an exit from a standby mode of the system on a chip.

Such an embodiment advantageously allows to restore the configuration diagram by, for example a microprocessor having a lower consumption, instead of using the first microprocessor which can be slower and/or have a higher consumption.

The embodiment providing restore means can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources and processing means at least configured to allow a user of the system on a chip to implement within the system on a chip at least one configuration diagram of this system.

According to this other aspect the system on a chip comprises
  from the master pieces of equipment, a first microprocessor configured to boot during a first boot of the system on a chip (cold boot) so as to allow the implementation of the configuration diagram, and a second master piece of equipment, for example a second microprocessor or a hardware state machine, and
  restore means configured to allow the second master piece of equipment to restore the configuration diagram instead of the first microprocessor in the event of an exit from a standby mode of the system on a chip.

More specifically, according to one embodiment, the first microprocessor is configured as a master manager piece of equipment before the system on a chip goes into standby mode, and the restore means comprise
  a first backup memory intended to back up the configuration diagram to be restored,
  a second program memory configured to store, upon control of the first microprocessor, a restore program executable by the second master piece of equipment,
  a secure storage means, for example one or more hardware registers, configured to store a signature of the restore program as well as the start address of the restore program in the second program memory,
  a wake-up source intended to generate a wake-up signal to the second master piece of equipment when the system on a chip exits from the standby mode, and
  a state machine configured, in the presence of the wake-up signal, to keep the first microprocessor in standby state, verify the signature, and in the event of successful verification, temporarily confer to the second master piece of equipment the quality of master manager piece of equipment and authorize the execution of the restore program by the second master piece of equipment, then when the restoration is complete, withdraw the quality of master manager piece of equipment from the second master piece of equipment and allow the first microprocessor to exit the standby mode and return to the first microprocessor its quality of master manager piece of equipment.

According to yet another embodiment, the system on a chip can comprise, from the master pieces of equipment, a test access port intended to be coupled to an external debugging tool, this test access port being assigned to a test identification piece of information and any slave resource is configured to accept receiving a transaction including this test identification piece of information, after verifying the security piece of information and the privileged piece of information attached to the transaction.

The embodiment providing an external debugging tool can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources.

According to this other aspect, the system on a chip comprises, from the master pieces of equipment, a test access port intended to be coupled to an external debugging tool, this test access port being assigned to a test identification piece of information and any slave resource is configured to accept receiving a transaction including this test identification piece of information, after verifying a security piece of information and a privileged piece of information attached to the transaction.

And, only the master manager piece of equipment is preferably configured to assign the test identification piece of information only to the test access port.

According to another aspect, a method for managing the operation of a system on a chip is proposed, the system on a chip comprising several master pieces of equipment, several slave resources, an interconnection circuit coupled between the master pieces of equipment and the slave resources and capable of routing transactions between master pieces of equipment and slave resources, the method comprising a configuration phase including defining at least one configuration diagram by a set of configuration pieces of information including at least one piece of identification information assigned to each master piece of equipment, this set of configuration pieces of information allowing to define an assignment of at least one piece of master equipment to at least some of the slave resources, and implementing within the system on a chip the at least one configuration diagram, and an operating phase including adding at least these identification pieces of information to all the transactions emitted by the corresponding master pieces of equipment, and addressing the slave resources without using the set of these configuration pieces of information.

According to one embodiment, a slave resource belongs to the group formed at least of a peripheral, a feature of a peripheral, a memory means internal to the system on a chip, a memory interface internal to the system on a chip and intended to be coupled to a memory means external to the system on a chip.

According to one embodiment, at least one piece of master equipment comprises a microprocessor.

According to one embodiment, the master pieces of equipment including microprocessors and master pieces of equipment controllable by these microprocessors, the same identification piece of information as the identification piece of information of the microprocessor are assigned to at least some of the master pieces of equipment controllable by a microprocessor.

According to one embodiment, at least one piece of master equipment controllable by a microprocessor is assigned an identification piece of information different from the identification piece of information of the microprocessor.

According to one embodiment, at least one piece of master equipment controllable by a microprocessor includes an output port capable of emitting transactions as well as an input port capable of receiving transactions, and the input port being considered as a slave resource and the output port as a master piece of equipment.

According to one embodiment, the configuration phase comprises implementing within the system on a chip an initial configuration diagram forming the configuration diagram.

According to one embodiment, the configuration phase comprises implementing within the system on a chip an initial configuration diagram having an initial set of configuration pieces of information, and the method comprises modifying the value of at least one piece of configuration information of this initial set so as to obtain the set of configuration pieces of information defining the configuration diagram.

According to one embodiment, the configuration phase comprises designating from the master pieces of equipment, a first master piece of equipment called master manager piece of equipment, this first master manager piece of equipment performing, in response to a first boot of the system on a chip, a boot phase at the end of which this first master manager piece of equipment authorises the implementation of the initial configuration diagram.

According to one embodiment, the designation of the first master manager piece of equipment is fixed and results from the production of the system on a chip.

According to one embodiment, the designation of the first master manager piece of equipment is programmable.

According to one embodiment, all the other master pieces of equipment are temporarily made inoperative as long as the first master manager piece of equipment has not completed its boot phase.

According one embodiment, the configuration phase comprises storing a boot program executable only by the first master manager piece of equipment during the first boot of the system on a chip.

According to one embodiment, the configuration phase comprises receiving a user program containing at least instructions representative of the initial configuration diagram, storing the user program, the first master manager piece of equipment executing, at the end of its boot phase, the user program in order to implement the initial configuration diagram.

According to one embodiment, the configuration phase includes a designation, from the master pieces of equipment, of a master piece of equipment called initial master manager piece of equipment, performing, during the first boot of the system on a chip, a boot phase at the end of which it authorises a boot of another master piece of equipment designated as a new master manager piece of equipment and forming the first master manager piece of equipment allowing at least, at the end of its boot phase, at least the implementation of the initial configuration diagram.

According to one embodiment, all the other master pieces of equipment are temporarily made inoperative as long as the boot phase of the initial master manager piece of equipment and that of the new master manager piece of equipment are not completed.

According to one embodiment, the configuration phase comprises storing a boot program executable only by the initial master manager piece of equipment during the first boot of the system on a chip and storing the boot program of the new master manager piece of equipment.

According to one embodiment, the configuration phase comprises receiving a user program containing at least instructions representative of the initial configuration diagram, storing the user program, the first master manager piece of equipment executing, at the end of its boot phase, the user program in order to implement the initial configuration diagram.

According to one embodiment, the operating phase comprises a designation by the first master manager piece of equipment designates, after it has allowed the implementation of the initial assignment diagram, of a second master piece of equipment as new master manager piece of equipment, the first master piece of equipment then losing its quality as master manager piece of equipment.

According to one embodiment, during the operating phase any new master manager piece of equipment in turn designates a new master manager piece of equipment and then loses its quality as master manager piece of equipment.

According to one embodiment, the set of configuration pieces of information of the configuration diagram further comprises, for at least one slave resource, an inaccessibility piece of information indicating whether this slave resource is inaccessible by any master piece of equipment or not.

According to one embodiment, the set of configuration pieces of information defining the configuration diagram further comprises, for each non-inaccessible slave resource, a filtering piece of information indicating whether this slave resource can be accessed by any master piece of equipment or by only one or more master pieces of equipment.

According to one embodiment, the set of configuration pieces of information defining the configuration diagram further comprises for each non-inaccessible slave resource,
 a first access piece of information indicating, in the case where the filtering piece of information indicates that the slave resource can be accessed by only one or more master pieces of equipment, that this slave resource can be accessed by one or more master pieces of equipment having the same identification piece of information, and
 the corresponding identification piece of information According to one embodiment, the set of configuration pieces of information defining the configuration diagram further comprises for each non-inaccessible slave resource,
 a second access piece of information indicating, in the case where the filtering piece of information indicates that the slave resource can be accessed by only one or more master pieces of equipment, that this slave resource can be accessed by master pieces of equipment having different identification pieces of information, and
 the list of identification pieces of information of the corresponding master pieces of equipment.

According to one embodiment, the set of configuration pieces of information defining the configuration diagram further comprises for at least one of the slave resources that can be accessed by the master pieces of equipment of the list, a third piece of information indicating that the at least one of the slave resources can only be accessed by one master piece of equipment at a time, the master piece of equipment wishing to access this slave resource during the operating phase using a semaphore.

According to one embodiment, the set of configuration pieces of information defining the configuration diagram further comprises for each non-inaccessible slave resource, a security piece of information indicating whether this slave resource is accessible by a master piece of equipment in secure mode or not.

According to one embodiment, the set of configuration pieces of information defining the configuration diagram further comprises for each non-inaccessible slave resource, a privileged piece of information indicating whether this slave resource is accessible by a master piece of equipment in privileged mode or not.

According to one embodiment, the set of configuration pieces of information defining the configuration diagram further comprises for each master piece of equipment, in addition to its identification piece of information, a security piece of information indicating whether this master piece of equipment is configured in secure mode or not.

According to one embodiment, the set of configuration pieces of information defining the configuration diagram further comprises for each master piece of equipment, in addition to its identification piece of information, privileged piece of information indicating whether this master piece of equipment is configured in privileged mode or not.

According to one embodiment, the method comprises a configuration of the first master manager piece of equipment in secure mode and in privileged mode at the end of its boot phase.

According to one embodiment, the set of configuration pieces of information defining the configuration diagram further comprises for at least some of the slave resources and at least some of the master pieces of equipment, a locking piece of information indicating whether their configuration pieces of information can be modified or not.

According to one embodiment, the method comprises updating the configuration pieces of information assigned to each slave resource and to each master piece of equipment, under the control of the first master manager piece of equipment.

According to one embodiment, the operating phase comprises executing a user program to modify the initial configuration diagram after its implementation and implementing the configuration diagram accordingly and possibly modify again any old configuration diagram.

According to one embodiment, only the master piece of equipment which has the quality of master manager piece of equipment is authorized to modify a configuration diagram.

According to one embodiment, each transaction emitted by a master piece of equipment comprises an addressing field whose content addresses the slave resource receiving this transaction, and the content of the addressing field does not belong to the set of configuration pieces of information.

According to one embodiment, each transaction emitted by a master piece of equipment comprises an addressing field whose content addresses the slave resource receiving this transaction, and the operating phase comprises adding to each transaction emitted by a master piece of equipment, at least the identification piece of information of this master piece of equipment, the identification piece of information not belonging to the addressing field of the transaction.

According to one embodiment, the operating phase comprises adding to each transaction emitted by a master piece of equipment, the security piece of information and/or the privileged piece of information if these two pieces of information or one of these two pieces of information do not already appear in the transaction emitted by the master piece of equipment.

According to one embodiment, at least one piece of configuration information is attached to each transaction, and the operating phase comprises verifying whether a transaction emanating from a master piece of equipment and intended for a slave resource is authorized to access this slave resource, the verification including using the at least one piece of configuration information attached to the transaction.

According to one embodiment, the verification includes using at least the identification piece of information attached to the transaction.

According to one embodiment, the verification comprises using at least the security piece of information and the privileged piece of information attached to the transaction.

According to one embodiment, the verification comprises using the configuration piece(s) of information attached to the transaction as well as other configuration pieces of information of the set of configuration pieces of information assigned to this slave resource.

According to one embodiment, the verification is performed downstream of the interconnection circuit.

According to one embodiment, the verification comprises local verifications performed at the slave resources from the configuration pieces of information respectively assigned to these slave resources.

According to one embodiment, the method further comprises, in the event that a read transaction emitted by a master piece of equipment and intended for a slave resource is not authorized to access this slave resource, returning to the master piece of equipment an indication of access denial and returning to the master manager piece of equipment, an illegal access notification containing an identifier of this slave resource, an indication of the type of access and the identification piece of information of the master piece of equipment at the origin of this denied transaction.

According to one embodiment, the method further comprises, in the event that a write transaction emitted by a master piece of equipment and intended for a slave resource is not authorized to access this slave resource, the fact of ignoring this transaction and returning to the master manager piece of equipment, an illegal access notification containing an identifier of this slave resource, an indication of the type of access and the identification piece of information of the master piece of equipment at the origin of this denied transaction.

According to one embodiment, the method comprises a storage of the identification piece of information of the current master manager piece of equipment, and an auxiliary verification including a comparison between the identification piece of information of the current master manager piece of equipment and the identification piece of information of a master piece of equipment wishing to modify at least one piece of configuration information, and a prohibition of a modification of the at least one piece of configuration information to any master piece of equipment having an identification piece of information different from that of the master manager piece of equipment.

According to one embodiment, among the master pieces of equipment at least one piece of master equipment has a slave port and a master port, configuration pieces of information being assigned to the slave port and configuration pieces of information being assigned to the master port, and the method further comprises, upon control, and by taking into account inheritance rules, replacing at least some of the configuration pieces of information assigned to the master port with the homologous configuration pieces of information assigned to the slave port or else keeping the configuration pieces of information assigned to the master port.

According to one embodiment,
several microprocessors are among the master pieces of equipment, and at least one slave resource generates at least one interrupt signal intended for one of the microprocessors which is assigned to this slave resource,
several interrupt wires are respectively connected to the microprocessors and to the at least one slave resource and capable of conveying interrupt signals,
and the method comprises routing the interrupt signal emitted by the slave resource only on the interrupt wire connected to the microprocessor which is assigned thereto.

According to one embodiment,
a first microprocessor is configured to boot during a first boot of the system on a chip so as to allow the implementation of the configuration diagram,
the method comprises restoring the configuration diagram by a second master piece of equipment in the event of an exit from a standby mode of the system on a chip.

According to one embodiment, the first microprocessor being the master manager piece of equipment before entering the standby mode, the restoration comprises
backing up the configuration diagram to be restored,
storing upon control of the first microprocessor, a restore program executable by the second master piece of equipment,
securely storing a signature of the restore program as well as the start address of the restore program,
generating a wake-up signal to the second master piece of equipment when the system on a chip exits from the standby mode, and
in the presence of the wake-up signal, keeping the first microprocessor in standby state, verifying the signature, and in the event of successful verification, temporarily allocating to the second master piece of equipment the quality of master manager piece of equipment and executing the restore program by the second master piece of equipment, then when the restoration is complete, withdrawing the quality of the master manager piece of equipment to the second master piece of equipment, exiting the first microprocessor from the standby mode, and allocating to the first microprocessor its quality of master manager piece of equipment.

According to one embodiment, the method comprises assigning to a test access port forming part of the master pieces of equipment and intended to be coupled to an external debugging tool, a test identification piece of information, and any slave resource accepts to receive a transaction including this test identification piece of information, after verifying the security piece of information and the privileged piece of information attached to the transaction.

According to one embodiment, only the master manager piece of equipment assigns the test identification piece of information only to the test access port.

According to one embodiment, the system on a chip forms a microcontroller or a microprocessor.

BRIEF DESCRIPTION OF THE DRAWINGS

Other advantages and features of the description will appear upon examining the detailed description of non-limiting embodiments and appended drawings:

FIG. 1 illustrates a system on a chip;

FIG. 2 illustrates a processing means of the system on a chip;

FIG. 3 illustrates static implementation of a configuration diagram;

FIG. 4 illustrates dynamic implementation of a configuration diagram;

FIG. 5 illustrates a master manager piece of equipment implementing an initial configuration diagram;

FIG. 6 illustrates a fixed designation of a master manager piece of equipment can be during production of the system on a chip;

FIG. 7 illustrates user programming of a designation register to designate the master manager piece of equipment;

FIG. 8 illustrates all the other master pieces of equipment being rendered inoperative while a first master manager piece of equipment is in its boot phase;

FIG. 9 illustrates installation means for implementing an initial configuration diagram;

FIG. 10 illustrates installation means configured to make all the other master pieces of equipment inoperative during the boot phases of the initial and new master manager pieces of equipment;

FIG. 11 illustrates changing the master manager piece of equipment during the execution of the user program after implementing the configuration diagram;

FIG. 12 illustrates an example of a set of configuration pieces of information defining a configuration diagram;

FIG. 13 illustrates a master manager piece of equipment controlling an update of the configuration diagram by the configuration controller which in turn updates the contents of the sets of registers;

FIG. 14 illustrates an example of the content of a transaction;

FIG. 15 illustrates addition means configured to add to each transaction emitted by a master piece of equipment the identification piece of information of the master piece of equipment;

FIG. 16 illustrates verification means configured to perform the verification downstream of the interconnection circuit;

FIG. 17 illustrates an auxiliary verification module verifying that a transaction arriving at the configuration controller is emitted by the master manager piece of equipment;

FIG. 18 illustrates a master piece of equipment having a slave port and a master port;

FIG. 19 illustrates a slave resource peripheral configured to generate an interrupt signal intended for one of the microprocessors that is assigned to the slave resource;

FIG. 20 illustrates master pieces of equipment including a first microprocessor configured to boot during the cold boot of the system on a chip, so as to allow the implementation of the configuration diagram SCH, and including a second microprocessor;

FIG. 21 illustrates restore means including a first backup memory intended to back up the configuration diagram to be restored, as well as a second program memory configured to store upon control of the first microprocessor a restore program executable by the second microprocessor;

FIG. 22 illustrates a state machine included in the restore means;

FIG. 23 illustrates a test access port of the system on a chip intended to be coupled to an external debugging tool; and FIG. 24 illustrates the master manager piece of equipment configured to assign the test identification piece of information only to the test access port.

DETAILED DESCRIPTION OF ILLUSTRATIVE EMBODIMENTS

In FIG. 1, the reference MCU designates a system on a chip here forming a microcontroller, although this example is not limiting.

The system on a chip MCU here comprises several master pieces of equipment CPU1, CPU2, LM3 . . . LMj . . . LMk.

In this example, the master pieces of equipment CPU1 and CPU2 are microprocessors and the other master pieces of equipment can be for example master pieces of equipment of Direct Memory Access type (DMA) or else for example USB controllers or even PCI express type master piece of equipment, without this list of examples being exhaustive.

The system on a chip MCU also includes several slave resources IMM1, IMTM2, PH3, PH4, PH5, PH60 and PH61.

Generally, a slave resource belongs to the group formed at least by a peripheral, a feature of a peripheral, a memory means internal to the system on a chip MCU, a memory interface internal to the system on a chip and intended to be coupled to a memory means external to the system on a chip.

Thus, in the example illustrated, the slave resource IMM1 is a memory means for the system on a chip.

The term "memory means" is understood here in a general manner and incorporates for example a complete memory or then one or more memory areas for example.

The slave resource IMTM2 is here an internal memory interface intended to be coupled to an external memory means EXMM, for example a DRAM memory.

The slave resources PH3, PH4 and PH5 are peripherals, for example a UART type peripheral, an $I^2C$ controller, an SPI controller.

The reference PH6 here designates a Real Time Clock (RTC) device including for example the module PH60 intended to provide the clock signal and the module PH61 intended for example to provide an alarm.

In this case, the modules PH60 and PH61 which are features of the real time clock device PH6 are considered as slave resources.

The structure of the master pieces of equipment and of the slave resources is conventional and known per se.

The system on a chip MCU moreover includes an interconnection circuit INTC capable of routing transactions between master pieces of equipment and slave resources.

The structure of such an interconnection circuit, which is generally a multilayer interconnection circuit, as well as the protocol allowing the exchange and the routing of the transactions inside the interconnection circuit are well known to the person skilled in the art.

This can for example refer in particular:

- to the article by Venkateswara Rao and others entitled "A Frame work on AMBA bus based Communication Architecture to improve the Real Time Computing Performance in MPSoC," International Journal of Computer Applications (0975-8887), Volume 91—No 5, April 2014, or
- a general presentation of these interconnection circuits made in 2015 by A. Gerstlauer and available at the internet address http://users.ece.utexas.edu/~gerstl/ee382v_f14/lectures/lecture_12.pdf.

Moreover, in an indicative but non-limiting manner, for example the interconnection circuit marketed by the company ARM under the reference NIC-400 (version Rop3) can be used.

The system on a chip also includes, associated with each master piece of equipment and with each slave resource, a set of configuration registers including several configuration registers intended for storing configuration pieces of information respectively, the meaning of which will be explained in more detail below.

The reference RGCM1 designates the set of configuration registers associated with the master piece of equipment CPU1.

The reference RGCM2 designates the set of configuration registers associated with the master piece of equipment CPU2.

The reference RGCM3 designates the set of configuration registers assigned to the master piece of equipment LM3.

The reference RGCMj designates the set of configuration registers assigned to the master piece of equipment LMj.

Moreover, the system on a chip here includes the master piece of equipment LMk, for example a USB controller controllable by a microprocessor, for example the microprocessor CPU1, and this master piece of equipment LMk includes an output port PS capable of emitting transactions as well as an input port PE capable of receiving transactions.

The input port PE is then considered as a slave resource and the output port PS is then considered as a master piece of equipment.

Therefore, the reference RGCMk designates the set of configuration registers assigned to the master piece of equipment PS.

The reference RGCS1 designates the set of configuration registers assigned to the slave resource IMM1.

The reference RGCS2 designates the set of configuration registers associated with the slave resource IMTM2.

The reference RGSC3 designates the set of configuration registers associated with the peripheral PH3.

The reference RGCS4 designates the set of configuration registers assigned to the peripheral PH4.

The reference RGCS5 designates the set of configuration registers assigned to the peripheral PH5.

The reference RGCS60 designates the set of configuration registers assigned to the feature PH60.

And, the reference RGCS61 designates the set of configuration registers assigned to the feature PH61.

Moreover, in this example, a register RDS, called designation register, is provided, the feature of which will be discussed in more detail but, which, can already be indicated that it is used to designate a master piece of equipment having the quality of a master manager piece of equipment.

Moreover, the register RGG, called manager register, the feature of which will also be discussed below in more detail, is used to designate the current master manager piece of equipment, which, as will be seen in more detail below, may possibly be modified during the operation of the system on a chip MCU, that is to say here during the execution of a user program.

The various sets of configuration registers are shown here within a controller RIFC.

However, they could be located outside the controller.

The system on a chip MCU also includes an elementary management unit RIMU1, RIMU2, RIMU3, RIMUj, RIMUk associated with each master piece of equipment.

The structure and feature of these elementary management units can be discussed in more detail, but it can be said that they are part of addition means intended to add to any transaction emitted by a master piece of equipment, an identification piece of information CID and optionally a security piece of information and/or a privileged piece of information.

The system on a chip also includes, associated with each slave resource, an elementary verification module RISU1, RISU2, RISU3, RISU4, RISU5, RISU60 and RISU61 the structure and feature of which will also be discussed in more detail below.

It can already be said that these elementary verification modules are part of the verification means intended to verify whether a transaction intended for a slave resource is authorized to access this slave resource.

The various elementary management units RIMU and the various elementary verification modules RISU are respectively connected to the sets of corresponding configuration registers by specific links, for example metal tracks.

While the elementary verification modules RISUi have been shown in FIG. 1 outside the corresponding peripherals, it is quite possible to provide one or more peripherals having their corresponding elementary verification module, integrated into the peripheral itself.

Now, if reference is made more particularly to FIG. 2, the system on a chip MCU includes processing means MT, distributed in particular within the various elements which have been described with reference to FIG. 1, and configured to allow a user of the system on a chip to implement within the system on a chip, during a configuration phase PHCFG (step 20), a configuration diagram SCH which is defined by the set of configuration pieces of information which will be stored in the various sets of configuration registers.

Before discussing in more detail the constitution of these configuration pieces of information, it can already be noted that the user has the possibility of implementing a static or dynamic configuration.

More specifically, as illustrated in FIG. 3, the processing means are configured to allow a user of the system on a chip to implement (step 20) an initial configuration diagram SCHI which will form the configuration diagram SCH.

In other words, according to this variant, once the initial configuration diagram has been implemented, it remains valid during the use or operating phase of the system on a chip.

Alternatively, as illustrated in FIG. 4, it is possible for a user, during the configuration phase PHCFG, to have implemented by the processing means MT (step 200) an initial configuration diagram having an initial set of configuration pieces of information then having the initial configuration diagram modified (step 201) by the processing means by modifying the value of at least one piece of configuration information, for example, of this initial set so as to obtain the set of configuration pieces of information defining a new configuration diagram SCH.

The processing means comprise installation means which include, from the master pieces of equipment, a first master piece of equipment called first master manager piece of equipment.

As illustrated in FIG. 5, this first master manager piece of equipment EMG is configured, in response to a first boot 50, or cold boot of the system on a chip, to perform a boot phase at the end of which this first master manager piece of equipment EMG is configured to at least allow the implementation 51 of the initial configuration diagram SCHI.

As schematically illustrated in FIG. 6, the designation of the first master manager piece of equipment EMG can be fixed during the production 60 of the system on a chip MCU, for example by hard-coding.

Alternatively, it is possible for the user to use the programmable designation register RDS allowing to designate the first master manager piece of equipment EMG.

More specifically, as illustrated in FIG. 7, during the provision 70 of the system on a chip MCU, the user can proceed with a programming 71 of the designation register RDS, for example by programming or not series of memories of the OTP type forming the designation register RDS so as to designate the master manager piece of equipment EMG, which is for example in this example the microprocessor CPU1.

In particular, in order to avoid conflicts, the installation means are further configured, as illustrated in FIG. 8, to temporarily make inoperative (step 81) all the other master pieces of equipment LM2, LM3, LMj, LMk, CPU2 as long as the first master manager piece of equipment EMG, here the microprocessor CPU1, has not completed its boot phase 80.

When a master piece of equipment is a microprocessor, it can be made inoperative by for example forcing the reset signal to 0 which keeps it in standby state.

When the other master pieces of equipment are equipment controlled by a microprocessor, they are of course inoperative as long as the processor itself is inoperative.

By way of example, as illustrated in FIG. 9, the installation means include, in addition to the master manager piece of equipment EMG, a boot memory (boot ROM) BMM configured to store, in a storage step 91, a boot program BPR executable only by the first master manager piece of equipment CPU1 during the first boot or cold boot of the system on a chip (steps 90 and 92).

The installation means moreover include an input INP (FIG. 1) configured to receive a user program. This user program can for example be stored on an SD card cooperating with the input INP.

This user program UPR (FIG. 9) is received from the input INP in step 94 and stored (step 95) in a program memory PMM.

This user program UPR contains at least instructions representative of the initial configuration diagram SCHI.

The processing means then include allocation means allowing to implement the initial configuration diagram.

In this example, the allocation means include the first master manager piece of equipment (for example the microprocessor CPU1) configured, at the end of its boot phase, to execute (step 93) the user program UPR in order to implement the initial configuration diagram.

While a microprocessor, for example the microprocessor CPU1, has been described here as the first master manager piece of equipment EMG, it is quite possible, alternatively, that the first master manager piece of equipment comprises a hardware logic circuit.

While a single master manager piece of equipment has just been described during the configuration phase PHCFG, it is possible, as schematically illustrated in FIG. 10, to modify the master manager piece of equipment during this configuration phase.

More specifically, the installation means then include, from the master pieces of equipment, a master piece of equipment called the initial master manager piece of equipment, for example the microprocessor CPU1, configured, during the first boot of the system on a chip, to perform a boot phase at the end of which it is configured to authorize a boot of another master piece of equipment designated as being a new master manager piece of equipment, for example the microprocessor CPU2.

This new master manager piece of equipment then forms the first master manager piece of equipment which is configured, at the end of its boot phase, to at least allow the implementation of the initial configuration diagram.

The initial master manager piece of equipment may comprise a microprocessor and the new master manager piece of equipment may comprise another microprocessor.

Alternatively, the initial master manager piece of equipment may comprise a hardware logic circuit and the new master manager piece of equipment may comprise a microprocessor.

And, here again, the installation means are configured to temporarily make all the other master pieces of equipment inoperative as long as the boot phase of the initial master manager piece of equipment and that of the new master manager piece of equipment are not completed.

As an example illustrated in FIG. 10, the installation means include in this regard a boot memory BMM configured to store (step 100) a boot program BPR1 executable only by the initial master manager piece of equipment CPU1 during the first boot or cold boot 101 of the system on a chip MCU.

The installation means also include a program memory PMM configured to store the boot program BPR2 of the new master manager piece of equipment CPU2.

A reception is then provided, for example via the input INP, of the boot program BPR2 and the user program UPR, these two programs being stored (step 104) in the program memory PMM.

During cold boot 101, the initial master manager piece of equipment CPU1 executes its boot program BPR1 (step 102) and then authorises the boot of the microprocessor CPU2 which is the new master manager piece of equipment.

The latter executes in step 105 its boot program PBR2 then the user program UPR (step 106) in order to implement the initial configuration diagram SCHI.

Of course, as indicated above, in step 107, the other master pieces of equipment LM2, LM3, LMj and LMk are inoperative.

While it has been seen previously that it was possible to change master manager piece of equipment during the configuration phase, it is also possible, as illustrated in FIG. 11, to change master manager piece of equipment during the operating phase PHF of the system on a chip, that is to say during the execution of the user program after implementing the configuration diagram.

More specifically, in FIG. 11, the microprocessor CPU1 is a first master manager piece of equipment. And, during the execution 11*o* of the user program UPR, the processing means MT modify (step 111) the master manager piece of equipment EMG which, in this case, becomes a new master manager piece of equipment CPU2.

It is of course possible that this new master manager piece of equipment CPU2 can in turn designate (step 112) a new master manager piece of equipment and then lose its quality as master manager piece of equipment. As an example, this new master manager piece of equipment may again be the microprocessor CPU1.

In this regard, only the master manager piece of equipment can designate a new master manager piece of equipment. And for example this is done by writing in the manager register RGG by the current master manager piece of equipment, the identification piece of information of the new master manager piece of equipment.

From that moment, the old master manager piece of equipment then has lost its quality as master manager piece of equipment.

Reference is now made more particularly to FIG. 12 to illustrate an example of a set of configuration pieces of information defining a configuration diagram SCH.

The set of configuration pieces of information includes, for each piece of equipment, an identification piece of information CID. This identification piece of information allows to identify the master piece of equipment from the list of master pieces of equipment.

This identification piece of information CID can for example be a digital word.

The set of configuration pieces of information of a master piece of equipment can also include security piece of information SEC, for example a bit, indicating, depending on the logical value of the bit, whether this master piece of equipment is configured in secure mode or not.

The set of configuration pieces of information for a master piece of equipment may also include a privileged piece of information PRV, for example a bit, indicating according to the logical value of the bit whether this master piece of equipment is configured in privileged mode or not.

This privileged piece of information may include several bits if several levels of privileged modes are provided. Finally, provision can be made for a locking piece of information LKM, for example one or more bits, which, depending on the logical value of the bit(s), indicate whether at least one of the configuration pieces of information, for example the configuration pieces of information SEC and PRV, or else the identification piece of information CID, can be modified or not.

It is also possible to provide one or more locking bits allowing to lock the content of the manager register RGG designating the identification piece of information of the master manager piece of equipment.

These configuration pieces of information associated with the master pieces of equipment are stored (step 120) in the corresponding set of configuration register RGCMi.

With regard to a slave resource, the set of configuration pieces of information associated therewith can comprise, for example, an inaccessibility piece of information INAC, for example a bit, intended to indicate, according to the logical value of the bit, that this slave resource is inaccessible by any master piece of equipment.

The configuration diagram SCH further comprises, for a non-inaccessible slave resource, a filtering piece of information IFLT, for example a bit, intended to indicate, based only on the identification pieces of information CID of the master pieces of equipment, whether this slave resource can be accessed by any master piece of equipment or by only one or more master pieces of equipment.

Thus, for example, if the filtering piece of information has the logical value "o", this means that there is no filtering applied to the identification pieces of information and that consequently, a slave resource can be accessed by any master piece of equipment, subject to any other access restrictions that will be seen in more detail below.

In fact, these sets of configuration pieces of information allow assigning at least one piece of master equipment to a slave resource.

It should be noted that several master pieces of equipment can have the same identification piece of information CID.

This is the case, for example, when these master pieces of equipment include a microprocessor and one or more master pieces of equipment controllable by this microprocessor. In this case, a compartment designated by the identification piece of information CID is formed.

All the master pieces of equipment of this compartment can then have for example access to the same memory resources.

It is also possible that a master piece of equipment controlled by a microprocessor, for security reasons, does not have the same identification piece of information as the microprocessor. This is for example the case for an equipment of the PCI-E type. In this case, this allows to limit access to some memory resources of this PCI-E type master piece of equipment.

The set of configuration pieces of information defining the configuration diagram may further comprise, for the non-accessible slave resource, a first access piece of information IAC1 intended to indicate, in the case where the filtering piece of information IFLT (IFLT=1 for example) indicates that the considered slave resource can be accessed by only one or more master pieces of equipment, that this slave resource can be accessed by one or more master pieces of equipment having the same identification piece of information CID.

In this case, of course, the set of configuration pieces of information includes this corresponding identification piece of information CID.

As indicated above, this identification piece of information CID can relate to a single master piece of equipment or to several master pieces of equipment in the same compartment.

The set of configuration pieces of information defining the configuration diagram SHC can further comprise for this non-accessible slave resource, a second access piece of information IAC2 intended to indicate, in the case where the filtering piece of information IFLT (IFLT=1) indicates that the slave resource can be accessed by only one or more master pieces of equipment, that this slave resource can be accessed by master pieces of equipment having different identification pieces of information CID. And, in this case, the set of configuration pieces of information of this slave resource includes the list CID1 . . . CID4, for example, of identification pieces of information of the corresponding master pieces of equipment.

Such a slave resource which can be accessed by several master pieces of equipment sequentially or simultaneously, can for example be a memory means.

On the other hand, it is possible for this slave resource which can be accessed by the master pieces of equipment of the list, that the set of configuration pieces of information comprises a third piece of information IAC3 intended to indicate that this slave resource can only be accessed by one master piece of equipment at a time, the master piece of equipment wishing to access this slave resource being configured to use a semaphore SMP.

This is the case, for example, when a slave resource can be accessed by two microprocessors. Only the microprocessor that takes the semaphore can access this slave resource and until the microprocessor has released the semaphore, the other microprocessor cannot access it. It will only be able to access it when it has taken in turn the semaphore SMP.

The set of configuration pieces of information defining the configuration diagram SCH for this slave resource can also comprise security piece of information ISEC, for example a bit, intended to indicate whether this slave resource is accessible by a secure master piece of equipment or not.

Likewise, the set of configuration pieces of information may include a privileged piece of information for this slave resource, for example a bit, IPRV, intended to indicate whether this slave resource is accessible by a master piece of equipment in privileged mode or not.

And, here again, it is also possible to use a locking piece of information LKS intended to indicate whether the configuration pieces of information of this slave resource can be modified or not.

All these configuration pieces of information assigned to a slave resource are stored (step 121) in the set of corresponding configuration registers RGCSi.

It should be noted here that the first master manager piece of equipment, for example the microprocessor CPU1, is configured to be in secure mode and in privileged mode at the end of its boot phase.

As indicated above, the allocation means allowing to implement the configuration diagram, particularly the initial configuration diagram, include the sets of configuration registers assigned to each slave resource and to each master piece of equipment as well as the configuration controller RIFC configured to update the contents of the sets of configuration registers with the set of configuration pieces of information under the control of the first master manager piece of equipment.

This is schematically illustrated in FIG. 13.

More specifically, the master manager piece of equipment CPU1 controls (step 130) an update of the configuration diagram SCH which is performed by the configuration controller RIFC which updates the contents of the sets of registers RGCMi and RGCSi (step 131).

And, only the master piece of equipment which has the quality of master manager piece of equipment is configured to modify a configuration diagram.

Reference is now made more particularly to FIG. 14 to describe an example of the content of a transaction TR.

Generally, here, each transaction TR emitted by a master piece of equipment comprises an addressing field ADR whose content is intended to address the slave resource receiving this transaction.

But the content of the addressing field ADR does not belong to the set of configuration pieces of information.

In other words, the content of the addressing field is not used alone or in combination, to define the assignments of the master pieces of equipment to the slave resources.

More specifically, as illustrated in FIG. 14, each transaction TR includes the identification piece of information CID of the master piece of equipment emitting this transaction, the security piece of information SEC, an indication EXE intended to indicate whether or not this transaction contains an execution instruction, the privileged piece of information PRV, a piece of information RW indicating whether it is a read or write transaction, the addressing field ADR and a data field DATA.

The processing means of the system on a chip include addition means configured to add to each transaction emitted by a master piece of equipment at least the identification piece of information of this master piece of equipment CID, this identification piece of information not belonging to the addressing field ADR of the transaction.

The addition means are further configured to add the security piece of information SEC and/or the privileged piece of information to each transaction emitted by a master piece of equipment if these two pieces of information do not already appear in the transaction emitted by the master piece of equipment.

As illustrated in FIG. 15, these addition means include for each master piece of equipment EMi, the associated elementary management unit RIMUi which is linked to the set of corresponding configuration registers RGCMi by the specific link LDMi.

Thus, the elementary management unit RIMUi completes the initial transaction TRI emitted by the master piece of equipment EMi by adding (step 150) the identification piece of information CID and optionally the pieces of information SEC and PRV thereto, the complete transaction TR then being supplied on the bus linked to the interconnection circuit INTC.

Materially, this elementary management unit RIMUi can comprise a logic circuit.

The processing means MT can also include verification means configured to verify whether a transaction TR emanating from a master piece of equipment and intended for a slave resource is authorized to access this slave resource using at least the configuration piece of information attached to the transaction, and in general at least some of the other configuration pieces of information of the set of configuration pieces of information assigned to this slave resource.

More specifically, as illustrated in FIG. 16, the verification means are configured to perform the verification downstream of the interconnection circuit INTC and these verification means include for each slave resource the elementary verification module RISUi which is configured to access the set of configuration pieces of information assigned to this slave resource and stored in the set of corresponding configuration registers RGCSi, via the specific link LDSi.

The access authorization verification is performed in step 160.

This verification allows to define whether in step 161 the access to the transaction TR intended for the slave resource RSSi is authorized or not.

This is for example the case if the filtering indication IFLT is enabled and the slave resource can only be accessed by one or more master pieces of equipment having the same identification piece of information, and the identification piece of information contained in the transaction TR does not correspond to the identification piece of information stored in the set of registers RGCSi.

The verification means then determine whether the denied transaction is a read transaction (step 163).

If this is the case, the elementary management unit RISUi returns to the master piece of equipment EMi emitting the denied transaction (step 164) an indication of access denial IR, for example a 0.

In parallel, the elementary verification module RISUi returns (step 165) to the master manager piece of equipment EMG an illegal access notification NIAC containing an identifier IDRSSi of the slave resource RSSi, the identification piece of information CIDi of the master piece of equipment EMI at the origin of this denied transaction, as well as the transaction type (here the read type).

If the denied transaction is a write transaction, then this transaction is purely and simply ignored (step 167) but the elementary verification module RISUi still returns to the master manager piece of equipment EMG the illegal access notification containing here again the identifier IDRSSi, the identification piece of information CIDi of the master piece equipment EMI at the origin of the denied transaction and the type of the denied transaction, here the write type.

Structurally, an elementary verification module RISU can include a logic circuit.

It was seen previously that only the master manager piece of equipment can send a transaction to the configuration controller, for example to update configuration registers.

In this regard, it is therefore necessary to verify that a transaction arriving at the configuration controller is indeed emitted by the master manager piece of equipment.

This is the role of an auxiliary verification module RISUC assigned to the configuration controller RIFC (FIG. 17).

In this regard, when a transaction TRC, in particular containing the identification piece of information CID of the master piece of equipment at the origin of this transaction TRC, is provided (step 170) to the auxiliary verification module RISUC, the latter, connected to the manager register RGG containing the identification piece of information CID of the current manager equipment, for example the microprocessor CPU1, verifies that the identification piece of information CID contained in the transaction TRC indeed corresponds to the identification piece of information CID1 (step 171).

If this is not the case, the access to the controller RIFC is denied (step 173).

On the other hand, if there is a match between the two identification pieces of information, then the transaction TRC is indeed provided to the configuration controller RIFC (step 172).

It was seen previously that from the master pieces of equipment, it is possible that there is at least one piece of master equipment having a slave port and a master port.

This is the case for example for the master piece of equipment LMk (FIG. 18) having an input port PE (slave port) and an output port PS (master port).

Such a master piece of equipment can for example be a USB controller which is controllable by a microprocessor but which can also be controllable during the execution of the user program, by another microprocessor.

The slave port PE is associated with an elementary verification module RISUk connected to the corresponding set of configuration registers RGCSk and the master port PS is associated with an elementary management unit RIMUk connected to the corresponding set of configuration registers RGCMk but also to the set of configuration registers RGCSk.

It is initially assumed that this master piece of equipment LMk is controlled by the microprocessor CPU1.

In this case, the set of configuration registers RGCSk to which the elementary verification module RISUk is linked contains the identification piece of information CID1 of the microprocessor 1 as well as the privileged and security piece of information corresponding to those of the microprocessor CPU1.

The set of registers RGCMk also includes the identification piece of information CID1 of the microprocessor CPU1 as well as the corresponding security and privileged pieces of information.

The processing means then include inheritance means MINH (FIG. 18) configured, upon control and by taking into account inheritance rules, to replace at least some of the configuration pieces of information assigned to the master port with the homologous configuration pieces of information assigned to the slave port or else to keep the configuration pieces of information assigned to the master port.

More specifically, these inheritance means MINH include a set of controllable switches SW, produced for example in hardware form, selectively connected to the set of registers RGMk and to the set of registers RGCSk.

The inheritance means MINH also include MCM control means, for example produced in software form within the microprocessor CPU1, and capable of emitting a control signal CSP intended to control the switch set SW taking into account the inheritance rules.

As long as the master piece of equipment LMk is controlled by the microprocessor CPU1, the control means MCM place the switch SW in position A so as to add to the transaction emitted by the master port PS, the identification piece of information CID1 as well as the corresponding privileged and security pieces of information.

On the other hand, if at a given instant there is a modification of the configuration diagram so that it is for example the microprocessor CPU2 which must take control of the master piece of equipment LMk, then, there is
on the one hand, an update of the set of configuration registers RGCSk with the new identification piece of information CID2 of the microprocessor CPU2 and with the corresponding privileged and security pieces of information and, on the other hand, a switching of the switch SW to position B so that, automatically, the identification piece of information CID2 of the microprocessor CPU2 and the corresponding security and privileged pieces of information are attached to the transaction emitted by the master port PS on the interconnection circuit INTC.

In other words, without it being necessary to perform a complete reprogramming of the system on a chip, there is an automatic inheritance by a simple switching, of the new pieces of information assigned to the slave port towards the master port.

It is also possible that not only several microprocessors, for example the microprocessors CPU1 and CPU2, appear among the master pieces of equipment, but also at least one slave resource, for example the peripheral PH5, configured to generate at least one interrupt signal intended for one of the microprocessors which is assigned to this slave resource, appears among the slave resources.

This is schematically illustrated in FIG. 19.

In this regard, several interrupt wires FRQ1, FRQ2 are respectively connected to the microprocessors CPU1 and CPU2 and to the at least one slave resource PH5.

These interrupt wires are capable of conveying IRQ interrupt signals.

The processing means then comprise interrupt filtering means MFIRQ configured to route the interrupt signal IRQ emitted by the slave resource PH5 only on the interrupt wire connected to the microprocessor which is assigned thereto, for example here only on the interrupt wire FRQ1 connected to the microprocessor CPU1 which is assigned to the peripheral PH5.

As illustrated in FIG. 19, these filtering means MFIRQ are incorporated at least in part into the elementary verification module RISU5 assigned to the slave resource PH5.

More specifically, in the elementary verification module RISU5 are provided several controllable switches SW1, SW2 connected between the output of the slave resource configured to provide the interrupt signal IRQ, and respectively the interrupt wires FRQ1 and FRQ2 connected to the microprocessors CPU1 and CPU2.

The interrupt filtering means also include control means MCM1, incorporated in the elementary verification module RISU5 or not, and configured to close the switch, (here the switch SW1) connected between the output SS5 and the interrupt wire FRQ1 connected to the microprocessor CPU1 assigned to the slave resource, and to open the other switch SW2.

Thus, it will not be possible to spy on the activity of the microprocessor CPU1 by means of the interrupt signals.

It is also possible, according to one embodiment, that the master pieces of equipment comprise a first microprocessor, for example the microprocessor CPU1, configured to boot during the first boot or cold boot of the system on a chip (steps 2000 and 2010, FIG. 20) so as to allow the implementation 2020 of the configuration diagram SCH, and a second microprocessor CPU2.

At some point, the system on a chip MCU can enter a standby state (step 2030).

Restore means MRST configured to allow the second processor CPU2 to restore (step 2050) the configuration diagram instead of the first microprocessor CPU1 are then provided in the event of an exit from the standby state of the system on a chip (step 2040).

This is particularly advantageous when the second microprocessor is for example faster and/or has a lower consumption than that of the first microprocessor CPU1.

In this regard, the restore means MRST comprise (FIG. 21) a first backup memory MM1 intended to back up the configuration diagram SCH to be restored, as well as a second program memory MM2 configured to store upon control of the first microprocessor (which is configured as master manager piece of equipment before entering the standby mode of the system on a chip MCU), a restore program PRGR executable by the second microprocessor CPU2.

The restore means MRST also include a secure storage means RGSS, for example a protected hardware register system, configured to store a signature of the restore program, as well as the start address of the restore program in the second program memory MM2.

The restore means MRST also include a wake-up source POR, of conventional structure, intended to generate a signal SRV for waking up the second microprocessor CPU2 when the system on a chip exits from the standby mode.

The restore means MRST also include a state machine STM.

As illustrated in FIG. 22, this state machine STM is configured, in the presence of the wake-up signal SRV, to
keep the first microprocessor CPU1 in standby state (step 2200) for example by forcing the reset signal (reset) to 0,
verify the signature SGN (step 2210) then,
in the event of successful verification (step 2220), temporarily confer to the second microprocessor CPU2 (step 2230) the quality of master manager piece of equipment (by storing in the manager register RGG the identification piece of information CID2 of this second microprocessor) and authorize the execution (step 2240) of the restore program PRGR by the second microprocessor CPU2.

Then, when the restoration of the configuration diagram SCH is complete, the state machine is configured to
remove the quality of master manager piece of equipment to the second microprocessor CPU2 (step 2250),
allow the first microprocessor CPU1 to exit the standby mode (step 2260) by releasing for example the reset signal and by returning the quality of master manager piece of equipment to the first microprocessor CPU1 (step 2270) by entering the identification piece of information CID1 of this first microprocessor CPU1 in the manager register.

According to yet another embodiment, it is possible that the system on a chip comprises, as illustrated in FIG. 23, from the master pieces of equipment, a test access port DAP, conforming for example to the standard JTAG, intended to be coupled to an external debugging tool DBT.

This test access port DAP is assigned to a test identification piece of information Debug_CID stored in a test register RGCDAP connected to the elementary management unit RIMUDAP assigned to this test access port.

And, as illustrated in FIG. 24, only the master manager piece of equipment EMG is configured to assign the test identification piece of information Debug_CID only to the test access port DAP. Indeed, any RSS slave resource is configured to accept to receive a transaction TR including this test identification piece of information Debug_CID, after verifying the security piece of information (SEC) and the privileged piece information (PRV) attached to the transaction.

Indeed, the access emanating from the test access port comply with the privilege and security concepts.

Thus, even if such a transaction is intended to be provided to a slave resource regardless of its identification piece of information CID, the security and privileged pieces of information attached to this transaction must advantageously correspond to those assigned to this slave resource.

Example embodiments of the present invention are summarized here. Other embodiments also can be understood from the entirety of the specification and the claims filed herein.

Example 1. A system on a chip, including several master pieces of equipment, several slave resources, an interconnection circuit (INTC) coupled between the master pieces of equipment and the slave resources and capable of routing transactions between master pieces of equipment and slave resources, and processing means (MT) at least configured to allow a user of the system on a chip to implement within the system on a chip (MCU) at least one configuration diagram (SCH) of this system defined by a set of configuration pieces of information including at least one piece of identification information (CID) assigned to each master piece of equipment, these identification pieces of information being intended to be attached to all the transactions (TR) emitted by the corresponding master pieces of equipment, the set of these configuration pieces of information not being used for addressing the slave resources receiving said transactions and being used to define an assignment of at least one piece of master equipment to at least some of the slave resources.

Example 2. The system on a chip according to example 1, where a slave resource belongs to the group formed at least by a peripheral (PH3), a feature (PH60) of a peripheral (PH6), a memory means (IMM1) internal to the system on a chip, a memory interface (INTM2) internal to the system on a chip and intended to be coupled to a memory means (EXMM) external to the system on a chip.

Example 3. The system on a chip according to one of the preceding examples, where at least one piece of master equipment (CPU1) includes a microprocessor.

Example 4. The system on a chip according to example 3, where the master pieces of equipment include microprocessors (CPU1, CPU2) and master pieces of equipment controllable by these microprocessors, and at least some of the master pieces of equipment controllable by a microprocessor are assigned the same identification piece of information (CID) as the identification piece of information (CID) of the microprocessor.

Example 5. The system on a chip according to example 4, where at least one piece of master equipment controllable by a microprocessor (CPU1) is assigned an identification piece of information different from the identification piece of information (CID) of said microprocessor.

Example 6. The system on a chip according to one of examples 4 or 5 as combined with example 2, where at least one piece of master equipment (LMk) controllable by a microprocessor includes an output port (PS) capable of emitting transactions as well as an input port (PE) capable of receiving transactions, said input port being considered as a slave resource and the output port as a master piece of equipment.

Example 7. The system on a chip according to one of the preceding examples, where the processing means (MT) are configured to allow a user of the system on a chip to implement within the system on a chip an initial configuration diagram (SCHI) forming said configuration diagram (SCH).

Example 8. The system on a chip according to one of examples 1 to 6, where the processing means (MT) are configured to allow a user of the system on a chip to implement within the system on a chip an initial configuration diagram (SCHI) having an initial set of configuration pieces of information and to modify the value of at least one piece of configuration information of this initial set so as to obtain said set of configuration pieces of information defining said configuration diagram (SCH).

Example 9. The system on a chip, according to one of examples 7 or 8, where the processing means (MT) include configuration means configured to allow a user of the system on a chip to define said initial configuration diagram and allocation means configured to implement the initial configuration diagram.

Example 10. The system on a chip according to one of the preceding examples as combined with one of examples 7 or 8, where the processing means (MT) include installation means including, from the master pieces of equipment, a first master piece of equipment called master manager piece of equipment (EMG), this first master manager piece of equipment being configured, in response to a first boot of the system on a chip, to perform a boot phase at the end of which this first master manager piece of equipment is configured to at least allow the implementation of said initial configuration diagram.

Example 11. The system on a chip according to example 10, where the designation of the first master manager piece of equipment (EMG) is fixed during the production of the system on a chip.

Example 12. The system on a chip according to example 10, where the installation means include a programmable designation register (RDS) allowing to designate the first master manager piece of equipment.

Example 13. The system on a chip according to example 10, where the installation means are further configured to temporarily make all the other master pieces of equipment inoperative as long as the first master manager piece of equipment (EMG) has not completed its boot phase.

Example 14. The system on a chip according to example 10, where the installation means further include a boot memory (BMM) configured to store a boot program (BPR) executable only by the first master manager piece of equipment (EMG) during said first boot of the system on a chip.

Example 15. The system on a chip according to examples 9 and 14, where the configuration means include an input (INP) configured to receive a user program (UPR) containing at least instructions representative of said initial configuration diagram and a program memory intended for storing the user program, and the allocation means include said first master manager piece of equipment configured, at the end of its boot phase, to execute said user program in order to implement said initial configuration diagram.

Example 16. The system on a chip according to example 10, where the first master manager piece of equipment (EMG) includes a microprocessor.

Example 17. The system on a chip according to example 10, where the first master manager piece of equipment (EMG) includes a hardware logic circuit.

Example 18. The system on a chip according to example 10, where the installation means include, from the master pieces of equipment, a master piece of equipment called the initial master manager piece of equipment (CPU1), configured, during the first boot of the system on a chip, to perform a boot phase at the end of which it is configured to authorize a boot of another master piece of equipment (CPU2) designated as a new master manager piece of equipment and forming said first master manager piece of equipment configured, at the end of its boot phase, to at least allow the implementation of said initial configuration diagram.

Example 19. The system on a chip according to example 18, where the initial master manager piece of equipment includes a microprocessor (CPU1) and the new master manager piece of equipment includes another microprocessor (CPU2).

Example 20. The system on a chip according to example 18, where the initial master manager piece of equipment includes a hardware logic circuit and the new master manager piece of equipment includes a microprocessor (CPU2).

Example 21. The system on a chip according to example 18, where the installation means are further configured to temporarily make all the other master pieces of equipment inoperative as long as the boot phase of the initial master manager piece of equipment (CPU1) and that of the new master manager piece of equipment (CPU2) are not completed.

Example 22. The system on a chip according to example 18, where the installation means further include a boot memory (BMM) configured to store a boot program executable only by the initial master manager piece of equipment (CPU1) during said first boot and a program memory (PMM) configured to store the boot program (BPR2) of the new master manager piece of equipment.

Example 23. The system on a chip according to examples 9 and 22, where the configuration means include an input (INP) configured to receive a user program containing at least instructions representative of said initial configuration diagram, said program memory also being intended for storing the user program, and the allocation means include said first master manager piece of equipment configured, at the end of its boot phase, to execute said user program in order to implement said initial configuration diagram.

Example 24. The system according to example 10, where the first master manager piece of equipment (CPU1) is further configured, after having allowed the initial assignment diagram to be implemented, to designate, during the execution of a user program by the processing means, a second master piece of equipment (CPU2) as new master manager piece of equipment, the first master piece of equipment then being configured to lose its quality as master manager piece of equipment.

Example 25. The system according to example 24, where any new master manager piece of equipment (CPU2) is in turn configured to designate a new master manager piece of equipment (CPU1) and then lose its quality as master manager piece of equipment.

Example 26. The system on a chip according to example 1, where the set of configuration pieces of information of the configuration diagram further includes, for at least one slave resource, an inaccessibility piece of information (INAC) intended to indicate that this slave resource is inaccessible by any master piece of equipment.

Example 27. The system on a chip according to example 1, where the set of configuration pieces of information defining the configuration diagram further includes for each non-inaccessible slave resource, a filtering piece of information (IFLT) intended to indicate whether this slave resource can be accessed by any master piece of equipment or by only one or more master pieces of equipment.

Example 28. The system on a chip according to example 27, where the set of configuration pieces of information defining the configuration diagram further includes for each non-inaccessible slave resource, —a first access piece of information (IAC1) intended to indicate, in the case where the filtering piece of information indicates that the slave resource can be accessed by only one or more master pieces of equipment, that this slave resource can be accessed by one or more master pieces of equipment having the same identification piece of information, and—the corresponding identification piece of information (CID).

Example 29. The system on a chip according to example 27, where the set of configuration pieces of information defining the configuration diagram further includes for each non-inaccessible slave resource, —a second access piece of information (IAC2) intended to indicate, in the case where the filtering piece of information indicates that the slave resource can be accessed by only one or more master pieces of equipment, that this slave resource can be accessed by master pieces of equipment having different identification pieces of information, and—the list (CID1 . . . CID4) of identification pieces of information of the corresponding master pieces of equipment.

Example 30. The system on a chip according to example 29, where the set of configuration pieces of information defining the configuration diagram further includes for at least one of the slave resources that can be accessed by the master pieces of equipment of said list, a third piece of information (IAC3) intended to indicate the at least one of said slave resources can only be accessed by one master piece of equipment at a time, the master piece of equipment wishing to access this slave resource being configured to use a semaphore.

Example 31. The system on a chip according to example 1, where the set of configuration pieces of information defining the configuration diagram further includes for each non-inaccessible slave resource, a security piece of information (ISEC) intended to indicate whether this slave resource is accessible by a master piece of equipment in secure mode or not.

Example 32. The system on a chip according to example 1, where the set of configuration pieces of information defining the configuration diagram further includes, for each non-inaccessible slave resource, a privileged piece of information (IPRV) intended to indicate whether this slave resource is accessible by a master piece of equipment in privileged mode or not.

Example 33. The system on a chip according to example 1, where the set of configuration pieces of information defining the configuration diagram further includes for each master piece of equipment, in addition to its identification piece of information (CID), a security piece of information (SEC) intended to indicate whether this master piece of equipment is configured in secure mode or not.

Example 34. The system on a chip according to example 1, where the set of configuration pieces of information defining the configuration diagram further includes for each master piece of equipment, in addition to its identification piece of information, a privileged piece of information (PRV) intended to indicate whether this master piece of equipment is configured in privileged mode or not.

Example 35. The system on a chip according to examples 10, 33 and 34, where the first master manager piece of equipment (EMG) is configured to be in secure mode and in privileged mode at the end of its boot phase.

Example 36. The system on a chip according to example 1, where the set of configuration pieces of information defining the configuration diagram further includes, for at least some of the slave resources and at least some of the master pieces of equipment, a locking piece of information (LKM, LKS) intended to indicate whether their configuration pieces of information can be modified or not.

Example 37. The system on a chip according to examples 9 and 10, where the allocation means include, in addition to the first master manager piece of equipment (EMG), —a set of configuration registers assigned to each slave resource and to each master piece of equipment, and—a configuration controller (RIFC) configured to update the contents of the sets of configuration registers with said set of configuration pieces of information under the control of the first master manager piece of equipment.

Example 38. The system on a chip according to example 37, where a set of configuration registers assigned to a slave resource is intended to store the various configuration pieces of information defined in examples 26 to 32 and 36 and assigned to this slave resource and a set of configuration registers assigned to each master piece of equipment is intended to store the identification piece of information assigned to this master piece of equipment and the configuration pieces of information assigned to this master piece of equipment defined in examples 33, 34 and 36.

Example 39. The system on a chip according to 0 example 8, where the processing means (MT) are configured to execute a user program to modify the initial configuration diagram after its implementation and to implement said configuration diagram accordingly and possibly modify again any old configuration diagram.

Example 40. The system on a chip according to examples 10 and 39, where only the master piece of equipment which has the quality of master manager piece of equipment is configured to modify a configuration diagram (SCH).

Example 41. The system on a chip according to examples 38 and 40, where in order to modify a configuration diagram, the master manager piece of equipment is configured to control the configuration controller (RIFC) so that it updates the contents of the configuration registers with the set of configuration pieces of information defining the new configuration diagram to be implemented.

Example 42. The system on a chip according to example 1, where each transaction (TR) emitted by a master piece of equipment includes an addressing field (ADR) whose content is intended to address the slave resource receiving this transaction, and the content of the addressing field does not belong to said set of configuration pieces of information.

Example 43. The system on a chip according to example 1, where each transaction (TR) emitted by a master piece of equipment includes an addressing field whose content is intended to address the slave resource receiving this transaction, and the processing means (MT) further include addition means configured to add to each transaction emitted by a master piece of equipment, at least the identification piece of information (CID) of this master piece of equipment, said identification piece of information not belonging to the addressing field of the transaction.

Example 44. The system on a chip according to examples 34 and 43, where the addition means are further configured to add to each transaction emitted by a master piece of equipment, the security piece of information (SEC) and/or the privileged piece of information (PRV) if these two pieces of information do not already appear in the transaction emitted by the master piece of equipment.

Example 45. The system on a chip according to example 43, where the addition means include for each master piece of equipment, an elementary management unit (RIMUi) configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Example 46. The system on a chip according to examples 38 and 45, where each elementary management unit (RIMUi) assigned to a master piece of equipment is connected by a dedicated link (LDMi) at least to the set of configuration registers (RGCMi) assigned to this master piece of equipment.

Example 47. The system on a chip according to example 1, where at least one piece of configuration information is intended to be attached to each transaction, and the processing means (MT) include verification means configured to verify whether a transaction emanating from a master piece of equipment and intended for a slave resource is authorized to access this slave resource, using said at least one piece of configuration information attached to said transaction.

Example 48. The system on a chip according to example 47, where the verification means are configured to verify whether a transaction emanating from a master piece of equipment and intended for a slave resource is authorized to access this slave resource, using at least said identification piece of information (CID) attached to said transaction.

Example 49. The system on a chip according to examples 33 and 47, where the verification means are configured to verify whether a transaction emanating from a master piece of equipment and intended for a slave resource is authorized to access this slave resource, using at least said security piece of information (SEC) and said privileged piece of information (PRV) attached to said transaction.

Example 50. The system on a chip according to examples 24 and 47, where the verification means are configured to verify whether a transaction emanating from a master piece of equipment and intended for a slave resource is authorized to access this slave resource, using the configuration piece(s) of information attached to said transaction (TR) as well as the other configuration pieces of information of the set of configuration pieces of information assigned to this slave resource.

Example 51. The system on a chip according to example 47, where the verification means are configured to perform said verification downstream of the interconnection circuit (INTC).

Example 52. The system on a chip according to example 47, where the verification means include for each slave resource, an elementary verification module (RISUi) configured to access the set of configuration pieces of information assigned to this slave resource.

Example 53. The system on a chip according to examples 37 and 52, where each elementary verification module (RISUi) assigned to a slave resource is connected by a dedicated link (LDSi) to the set of configuration registers (RGCSi) assigned to this slave resource.

Example 54. The system on a chip according to example 52, where the processing means include a manager register (RGG) intended to contain the identification piece of information of the current master manager piece of equipment, and an auxiliary verification module (RISUC) assigned to said controller and configured to prohibit access to said controller to any master piece of equipment having an identification piece of information different from that contained in said manager register.

Example 55. The system on a chip according to examples 10 and 47, where the verification means are further configured, in the event that a read transaction emitted by a master piece of equipment and intended for a slave resource is not authorized to access this slave resource, to return to the master piece of equipment an indication of access denial (IR) and return to the master manager piece of equipment, an illegal access notification (NIAC) containing an identifier of this slave resource, an indication of the type of access and the identification piece of information of the master piece of equipment at the origin of this denied transaction.

Example 56. The system on a chip according to examples 10 and 47, where the verification means are further configured, in the event that a write transaction emitted by a master piece of equipment and intended for a slave resource is not authorized to access this slave resource, to ignore this transaction and to return to the master manager piece of equipment, an illegal access notification (NIAC) containing an identifier of this slave resource, an indication of the type of access and the identification piece of information of the master piece of equipment at the origin of this denied transaction.

Example 57. The system on a chip according to example 1, including among the master pieces of equipment at least one piece of master equipment having a slave port and a master port, configuration pieces of information being assigned to the slave port and configuration pieces of information being assigned to the master port, and where the processing means include inheritance means (MINH) configured, upon control and by taking into account inheritance rules, to replace at least some of the configuration pieces of information assigned to the master port with the homologous configuration pieces of information assigned to the slave port or else to keep the configuration pieces of information assigned to the master port.

Example 58. The system on a chip according to examples 37, 45 and 57, where the inheritance means (MINH) include—within the elementary management unit (RIMUk) assigned to the master port, a set of controllable switches connected to at least some of the configuration registers assigned to the slave port and to the homologous configuration registers assigned to the master port, and—control means (MCM) configured to control the set of switches so as to select either the corresponding configuration registers assigned to the master port or the corresponding configuration registers assigned to the slave port.

Example 59. The system on a chip according to example 1, including—from the master pieces of equipment, several microprocessors, —from the slave resources at least one slave resource configured to generate at least one interrupt signal intended for one of the microprocessors which is assigned to this slave resource, —several interrupt wires respectively connected to the microprocessors and to said at least one slave resource and capable of conveying interrupt signals, and—system on a chip where the processing means include interrupt filtering means (MFIRQ) configured to route the interrupt signal emitted by said slave resource only on the interrupt wire connected to the microprocessor which is assigned thereto.

Example 60. The system on a chip according to examples 52 and 59, where the interrupt filtering means (MFIRQ) are incorporated at least in part into the elementary verification module (RISU5) assigned to said slave resource.

Example 61. The system on a chip according to example 60, where the interrupt filtering means (MFIRQ) include—in the elementary verification module, several controllable switches connected between the output of the slave resource configured to provide the interrupt signal and respectively the interrupt wires connected to the microprocessors, and—control means configured to close the switch connected between said output and the interrupt wire connected to the microprocessor assigned to said slave resource, and to open the other switch/switches.

Example 62. The system on a chip according to example 1, including—from the master pieces of equipment a first microprocessor configured to boot during a first boot of the system on a chip so as to allow the implementation of the configuration diagram, and a second master piece of equipment, for example a second microprocessor, and—restore means (MRST) configured to allow the second master piece of equipment to restore the configuration diagram instead of the first microprocessor in the event of an exit from a standby mode of the system on a chip.

Example 63. The system on a chip according to examples 10 and 62, where the first microprocessor is configured as master manager piece of equipment before entering the standby mode, and the restore means (MRST) include—a first backup memory intended to back up the configuration diagram to be restored, —a second program memory configured to store, upon control of the first microprocessor, a restore program executable by the second master piece of equipment, —a secure storage means configured to store a signature of said restore program as well as the start address of the restore program in said second program memory, —a wake-up source intended to generate a wake-up signal to the second master piece of equipment when the system on a chip exits from the standby mode, and—a state machine (STM) configured, in the presence of said wake-up signal, to keep the first microprocessor in standby state, verify said signature, and in the event of successful verification, temporarily confer to the second master piece of equipment the quality of master manager piece of equipment and authorize the execution of the restore program by the second master piece of equipment, then when the restoration is complete, withdraw the quality of master manager piece of equipment from the second master piece of equipment, allow the first microprocessor to exit the standby mode, and return to the first microprocessor its quality of master manager piece of equipment.

Example 64. The system on a chip according to example 49, including from the master pieces of equipment a test access port (DAP), intended to be coupled to an external debugging tool, this test access port being assigned to a test identification piece of information (Debug_CID), and any slave resource is configured to accept receiving a transaction including this test identification piece of information, after verifying said security piece of information (SEC) and said privileged piece of information (PRV) attached to said transaction.

Example 65. The system on a chip according to examples 10 and 64, where only the master manager piece of equipment is configured to assign the test identification piece of information only to the test access port (DAP).

Example 66. The system on a chip according to example 1, forming a microcontroller (MCU) or a microprocessor.

Example 67. A method for managing the operation of a system on a chip, the system on a chip including several master pieces of equipment, several slave resources, an interconnection circuit coupled between the master pieces of equipment and the slave resources and capable of routing transactions between master pieces of equipment and slave resources, the method including—a configuration phase (PHCFG) including defining at least one configuration diagram by a set of configuration pieces of information including at least one piece of identification information (CID) assigned to each master piece of equipment, this set of configuration pieces of information allowing to define an assignment of at least one piece of master equipment to at least some of the slave resources, and implementing within the system on a chip said at least one configuration diagram, and—an operating phase (PHF) including adding at least These identification pieces of information to all the transactions emitted by the corresponding master pieces of equipment, and addressing the slave resources without using the set of these configuration pieces of information.

Example 68. The method according to example 67, where a slave resource belongs to the group formed at least of a peripheral (PH3), a feature (PH60, PH61) of a peripheral (PH6), a memory means internal to the system on a chip, a memory interface internal to the system on a chip and intended to be coupled to a memory means external to the system on a chip.

Example 69. The method according to one of examples 67 or 68, where at least one piece of master equipment includes a microprocessor (CPU1).

Example 70. The method according to example 69, where, the master pieces of equipment including microprocessors and master pieces of equipment controllable by these microprocessors, at least some master pieces of equipment controllable by a microprocessor are assigned the same identification piece of information as the identification piece of information (CID) of the microprocessor.

Example 71. The method according to example 70, where at least one piece of master equipment controllable by a microprocessor is assigned an identification piece of information different from the identification piece of information (CID) of said microprocessor.

Example 72. The method according to example 70 or 71 as combined with example 68, where at least one piece of master equipment controllable by a microprocessor includes an output port (PS) capable of emitting transactions as well as an input port (PE) capable of receiving transactions, and said input port is considered as a slave resource and the output port as a master piece of equipment.

Example 73. The method according to one of examples 67 to 72, where said configuration phase (PHCFG) includes implementing within the system on a chip an initial configuration diagram forming said configuration diagram.

Example 74. The method according to one of examples 67 to 72, where said configuration phase (PHCFG) includes implementing within the system on a chip an initial configuration diagram having an initial set of configuration pieces of information, and the method includes modifying the value of at least one piece of configuration information of this initial set so as to obtain said set of configuration pieces of information defining said configuration diagram.

Example 75. The method according to one of examples 73 or 74, where the configuration phase (PHCFG) includes designating from the master pieces of equipment, a first master piece of equipment called master manager piece of equipment, this first master manager piece of equipment performing, in response to a first boot of the system on a chip, a boot phase at the end of which this first master manager piece of equipment authorizes the implementation of said initial configuration diagram.

Example 76. The method according to example 75, where the designation of the first master manager piece of equipment (CPU1) is fixed and results from the production of the system on a chip.

Example 77. The method according to example 75, where the designation of the first master manager piece of equipment (CPU1) is programmable.

Example 78. The method according to one of examples 75 to 77, where all the other master pieces of equipment are temporarily made inoperative as long as the first master manager piece of equipment (EMG) has not completed its boot phase.

Example 79. The method according to one of examples 75 to 78, where the configuration phase (PHCFG) includes storing a boot program executable only by the first master manager piece of equipment during said first boot of the system on a chip.

Example 80. The method according to example 79, where the configuration phase (PHCFG) includes receiving a user program containing at least instructions representative of said initial configuration diagram, storing the user program, said first master manager piece of equipment executing, at the end of its boot phase, said user program in order to implement said initial configuration diagram.

Example 81. The method according to example 75, where the configuration phase (PHCFG) includes a designation from the master pieces of equipment, of a master piece of equipment called initial master manager piece of equipment, performing, during the first boot of the system on a chip, a boot phase at the end of which it authorizes a boot of another master piece of equipment designated as a new master manager piece of equipment and forming said first master manager piece of equipment allowing at least, at the end of its boot phase, at least the implementation of said initial configuration diagram.

Example 82. The method according to example 81, where all the other master pieces of equipment are temporarily made inoperative as long as the boot phase of the initial master manager piece of equipment (CPU1) and that of the new master manager piece of equipment (CPU2) are not completed.

Example 83. The method according to one of examples 81 or 82, where the configuration phase (PHCFG) includes storing a boot program executable only by the initial master manager piece of equipment during said first boot of the system on a chip and storing the boot program of the new master manager piece of equipment.

Example 84. The method according to example 83, where the configuration phase (PHCFG) includes receiving a user program containing at least instructions representative of said initial configuration diagram, storing the user program, said first master manager piece of equipment executing, at the end of its boot phase, said user program in order to implement said initial configuration diagram.

Example 85. The method according to one of examples 75 to 84, where the operating phase (PHF) includes a designation by the first master manager piece of equipment designates, after it has allowed implementing the initial assignment diagram, of a second master piece of equipment as new master manager piece of equipment, the first master piece of equipment then losing its quality as master manager piece of equipment.

Example 86. The method according to example 85, where during the operating phase (PHF) any new master manager piece of equipment in turn designates a new master manager piece of equipment and then loses its quality as master manager piece of equipment.

Example 87. The method according to example 67, where the set of configuration pieces of information of the configuration diagram further includes, for at least one slave resource, an inaccessibility piece of information (INAC) indicating whether this slave resource is inaccessible by any master piece of equipment or not.

Example 88. The method according to one of examples 67 to 87, where the set of configuration pieces of information defining the configuration diagram further includes for each non-inaccessible slave resource, a filtering piece of information (IFLT) indicating whether this slave resource can be accessed by any master piece of equipment or by only one or more master pieces of equipment.

Example 89. The method according to example 88, where the set of configuration pieces of information defining the configuration diagram further includes for each non-inaccessible slave resource, —a first access piece of information (IAC1) indicating, in the case where the filtering piece of information indicates that the slave resource can be accessed by only one or more master pieces of equipment, that this slave resource can be accessed by one or more master pieces of equipment having the same identification piece of information, and—the corresponding identification piece of information.

Example 90. The method according to example 88, where the set of configuration pieces of information defining the configuration diagram further includes for each non-inaccessible slave resource, —a second access piece of information (IAC2) indicating, in the case where the filtering piece of information indicates that the slave resource can be accessed by only one or more master pieces of equipment, that this slave resource can be accessed by master pieces of equipment having different identification pieces of information, and—the list of identification pieces of information of the corresponding master pieces of equipment.

Example 91. The method according to example 90, where the set of configuration pieces of information defining the configuration diagram further includes for at least one of the slave resources that can be accessed by the master pieces of equipment of said list, a third piece of information (IAC3) indicating that at least one of said slave resources can only be accessed by one master piece of equipment at a time, the master piece of equipment wishing to access this slave resource during the operating phase using a semaphore (SMP).

Example 92. The method according to one of examples 67 to 91, where the set of configuration pieces of information defining the configuration diagram further includes for each non-inaccessible slave resource, a security piece of information (ISEC) indicating whether this slave resource is accessible by a master piece of equipment in secure mode or not.

Example 93. The method according to one of examples 67 to 92, where the set of configuration pieces of information defining the configuration diagram further includes for each non-inaccessible slave resource, a privileged piece of information (IPRV) indicating whether this slave resource is accessible by a master piece of equipment in privileged mode or not.

Example 94. The method according to one of examples 67 to 93, where the set of configuration pieces of information defining the configuration diagram further includes for each master piece of equipment, in addition to its identification piece of information, a security piece of information (SEC) indicating whether this master piece of equipment is configured in secure mode or not.

Example 95. The method according to one of examples 67 to 94, where the set of configuration pieces of information defining the configuration diagram further includes for each master piece of equipment, in addition to its identification piece of information, a privileged piece of information (PRV) indicating whether this master piece of equipment is configured in privileged mode or not.

Example 96. The method according to examples 75, 94 and 95, including a configuration of the first master manager piece of equipment (CPU1) in secure mode and in privileged mode at the end of its boot phase.

Example 97. The method according to one of examples 67 to 96, where the set of configuration pieces of information defining the configuration diagram further includes, for at least some of the slave resources and at least some of the master pieces of equipment, a locking piece of information (LKM, LKS) indicating whether their configuration pieces of information can be modified or not.

Example 98. The method according to one of examples 67 to 97 as combined with example 75, including updating the configuration pieces of information assigned to each slave resource and to each master piece of equipment, under the control of the first master manager piece of equipment (EMG).

Example 99. The method according to one of examples 67 to 98 as combined with example 74, where the operating phase (PHF) includes executing a user program to modify the initial configuration diagram after its implementation and to implement said configuration diagram accordingly and possibly modify again any old configuration diagram.

Example 100. The method according to example 99 as combined with one of examples 75 to 82, where only the master piece of equipment which has the quality of master manager piece of equipment (EMG) is authorized to modify a configuration diagram.

Example 101. The method according to one of examples 67 to 100, where each transaction (TR) emitted by a master piece of equipment includes an addressing field whose content addresses the slave resource receiving this transaction, and the content of the addressing field does not belong to said set of configuration pieces of information.

Example 102. The method according to one of examples 67 to 100, where each transaction (TR) emitted by a master piece of equipment includes an addressing field whose content addresses the slave resource receiving this transaction, and the operating phase includes adding to each transaction emitted by a master piece of equipment, at least the identification piece of information of this master piece of equipment, said identification piece of information not belonging to the addressing field of the transaction.

Example 103. The method according to example 102 as combined with example 94 or 95, where the operating phase (PHF) includes adding to each transaction emitted by a master piece of equipment, the security piece of information and/or the privileged piece of information if these two pieces of information or one of these two pieces of information do not already appear in the transaction emitted by the master piece of equipment.

Example 104. The method according to one of examples 67 to 103, where at least one piece of configuration information is attached to each transaction, and the operating phase (PHF) includes verifying whether a transaction emanating from a master piece of equipment and intended for a slave resource is authorized to access this slave resource, said verification including using said at least one piece of configuration information attached to said transaction.

Example 105. The method according to example 104, where said verification includes using at least said identification piece of information (CID) attached to said transaction.

Example 106. The method according to example 104 or 105 as combined with examples 94 and 95, where said verification includes using at least said security piece of information (SEC) and said privileged piece of information (PRV) attached to said transaction.

Example 107. The method according to one of examples 104 to 106 as combined with examples 87 to 93 and 97, where said verification includes using the configuration piece(s) of information attached to said transaction (TR) as well as other configuration pieces of information of the set of configuration pieces of information assigned to this slave resource.

Example 108. The method according to one of examples 104 to 107, where said verification is performed downstream of the interconnection circuit (INTC).

Example 109. The method according to one of examples 104 to 108, where said verification includes local verifications (RISUi) performed at the slave resources from the configuration pieces of information respectively assigned to these slave resources.

Example 110. The method according to one of examples 104 to 109 as combined with one of examples 75 to 82, further including in the event that a read transaction emitted by a master piece of equipment and intended for a slave resource is not authorized to access this slave resource, returning to the master piece of equipment an indication of access denial (IR) and returning to the master manager piece of equipment, an illegal access notification (NIAC) containing an identifier of this slave resource, an indication of the type of access and the identification piece of information of the master piece of equipment at the origin of this denied transaction.

Example 111. The method according to one of examples 104 to 110 as combined with one of examples 75 to 82, further including, in the event that a write transaction emitted by a master piece of equipment and intended for a slave resource is not authorized to access this slave resource, the fact of ignoring this transaction and returning to the master manager piece of equipment, an illegal access notification (NIAC) containing an identifier of this slave resource, an indication of the type of access and the identification piece of information of the master piece of equipment at the origin of this denied transaction.

Example 112. The method according to one of examples 67 to 111 as combined with one of examples 75 to 82, including a storage of the identification piece of information of the current master manager piece of equipment, and an auxiliary verification including a comparison (171) between the identification piece of information of the current master manager piece of equipment and the identification piece of information of a master piece of equipment wishing to modify at least one piece of configuration information, and a prohibition of a modification of said at least one piece of configuration information to any master piece of equipment having an identification piece of information different from that of the master manager piece of equipment.

Example 113. The method according to one of examples 67 to 112, including among the master pieces of equipment at least one piece of master equipment having a slave port (PS) and a master port (PE), configuration pieces of information assigned to the slave port and configuration pieces of information assigned to the master port, the method further including, upon control and by taking into account inheritance rules, replacing at least some of the configuration pieces of information assigned to the master port with the homologous configuration pieces of information assigned to the slave port or else keeping the configuration pieces of information assigned to the master port.

Example 114. The method according to one of examples 67 to 113, including, —several microprocessors being among the master pieces of equipment, and at least one slave resource generating at least one interrupt signal (IRQ) intended for one of the microprocessors which is assigned to this slave resource, —several interrupt wires (FRQ1, FRQ2) being respectively connected to the microprocessors and to said at least one slave resource and capable of conveying interrupt signals, —routing the interrupt signal emitted by said slave resource only on the interrupt wire connected to the microprocessor which is assigned thereto.

Example 115. The method according to one of examples 67 to 114, including—a first microprocessor (CPU1) configured to boot during a first booted of the system on a chip so as to allow the implementation of the configuration diagram, —restoring the configuration diagram by a second master piece of equipment (CPU2) in the event of an exit from a standby mode of the system on a chip.

Example 116. The method according to example 115 as combined with one of examples 75 to 82, where the first microprocessor being the master manager piece of equipment before entering the standby mode, the restoration (205) includes—backing up the configuration diagram to be restored, —storing upon control of the first microprocessor, a restore program executable by the second master piece of equipment, —securely storing a signature of said restore program as well as the start address of the restore program, —generating a wake-up signal to the second master piece of equipment when the system on a chip exits from the standby mode, and—in the presence of said wake-up signal, keeping the first microprocessor in standby state, verifying said signature, and in the event of successful verification, temporarily allocating to the second master piece of equipment the quality of master manager piece of equipment and executing the restore program by the second master piece of equipment, then when the restoration is complete, withdrawing the quality of the master manager piece of equipment to the second master piece of equipment, exiting the first microprocessor from the standby mode, and allocating to the first microprocessor its quality of master manager piece of equipment.

Example 117. The method according to one of examples 67 to 116 as combined with example 116, including assigning to a test access port (DAP) forming part of the master pieces of equipment and intended to be coupled to an external debugging tool, a test identification piece of information (Debug_CID), and any slave resource accepts to receive a transaction including this test identification piece of information, after verifying said security piece of information (SEC) and said privileged piece of information (PRV) attached to said transaction.

Example 118. The method according to example 117, as combined with any of examples 75 to 82, where only the master manager piece of equipment assigns the test identification piece of information only to the test access port (DAP).

Example 119. The method according to one of the preceding examples, where the system on a chip forms a microcontroller (MCU) or a microprocessor.

What is claimed is:

1. A system on a chip, comprising:
   a plurality of master pieces of equipment;
   a plurality of slave resources;
   an interconnection circuit coupled between the master pieces of equipment and the slave resources and capable of routing transactions between master pieces of equipment and slave resources; and
   a processing unit configured to:
      allow a user of the system on a chip to implement within the system on a chip at least one configuration diagram of the system defined by a set of configuration pieces of information including at least one piece of identification information assigned to each master piece of equipment, wherein the identification pieces of information are intended to be attached to all the transactions emitted by the corresponding master pieces of equipment, and wherein the set of the configuration pieces of information are not used for addressing the slave resources receiving the transactions and are used to define an assignment of at least one piece of master equipment to at least some of the slave resources; and
      allow the user of the system on a chip to implement within the system on a chip an initial configuration diagram forming the configuration diagram;
   wherein the processing unit comprises an installation unit including, from the master pieces of equipment, a first master manager piece of equipment, wherein the first master manager piece of equipment is configured to, in response to a first boot of the system on a chip, perform a boot phase at an end of which the first master manager piece of equipment is configured to at least allow implementation of the initial configuration diagram; and
   wherein the installation unit is configured to temporarily make all the other master pieces of equipment inoperative as long as the first master manager piece of equipment has not completed its boot phase.

2. The system on a chip according to claim 1, wherein each slave resource belongs to a group formed at least by a peripheral, a feature of the peripheral, a memory unit internal to the system on a chip, and a memory interface internal to the system on a chip and intended to be coupled to a memory unit external to the system on a chip.

3. The system on a chip according to claim 1, wherein at least one piece of master equipment comprises a microprocessor.

4. The system on a chip according to claim 3, wherein the master pieces of equipment include microprocessors and master pieces of equipment controllable by the microprocessors, and at least some of the master pieces of equipment controllable by a respective microprocessor are assigned the same identification piece of information as the identification piece of information of the respective microprocessor.

5. The system on a chip according to claim 4, wherein at least one piece of master equipment controllable by the respective microprocessor is assigned an identification piece of information different from the identification piece of information of the respective microprocessor.

6. The system on a chip according to claim 4,
   wherein each slave resource belongs to a group formed at least by a peripheral, a feature of the peripheral, a memory unit internal to the system on a chip, and a memory interface internal to the system on a chip and intended to be coupled to a memory unit external to the system on a chip; and
   wherein at least one piece of master equipment controllable by the respective microprocessor includes an output port capable of emitting transactions as well as an input port capable of receiving transactions, the input port being considered as a slave resource and the output port as the master piece of equipment.

7. The system on a chip according to claim 1, wherein the processing unit is configured to allow the user of the system on a chip to implement within the system on a chip an initial configuration diagram having an initial set of configuration pieces of information and to modify a value of at least one piece of configuration information of the initial set so as to obtain the set of configuration pieces of information defining the configuration diagram.

8. The system on a chip, according to claim 1, wherein the processing unit includes a configuration unit configured to allow the user of the system on a chip to define the initial configuration diagram and an allocation unit configured to implement the initial configuration diagram.

9. The system on a chip according to claim 1, wherein designation of the first master manager piece of equipment is fixed during production of the system on a chip.

10. The system on a chip according to claim 1, wherein the installation unit includes a programmable designation register allowing designation of the first master manager piece of equipment.

11. The system on a chip according to claim 1, wherein the installation unit further includes a boot memory configured to store a boot program executable only by the first master manager piece of equipment during the first boot of the system on a chip.

12. The system on a chip according to claim 11,
wherein the processing unit includes a configuration unit configured to allow the user of the system on a chip to define the initial configuration diagram and an allocation unit configured to implement the initial configuration diagram; and
wherein the configuration unit includes an input configured to receive a user program containing at least instructions representative of the initial configuration diagram and a program memory intended for storing the user program, and the allocation unit includes the first master manager piece of equipment configured, at the end of its boot phase, to execute the user program in order to implement the initial configuration diagram.

13. The system on a chip according to claim 1, wherein the first master manager piece of equipment comprises a microprocessor.

14. The system on a chip according to claim 1, wherein the first master manager piece of equipment comprises a hardware logic circuit.

15. The system on a chip according to claim 1,
wherein the set of configuration pieces of information defining the configuration diagram further comprises for each master piece of equipment, in addition to its identification piece of information:
a security piece of information intended to indicate whether the master piece of equipment is configured in secure mode or not; and
a privileged piece of information intended to indicate whether the master piece of equipment is configured in privileged mode or not; and
wherein the first master manager piece of equipment is configured to be in secure mode and in privileged mode at the end of its boot phase.

16. The system on a chip according to claim 1, wherein the set of configuration pieces of information defining the configuration diagram further comprises, for at least some of the slave resources and at least some of the master pieces of equipment, a locking piece of information intended to indicate whether their configuration pieces of information can be modified or not.

17. The system on a chip according to claim 1,
wherein the processing unit includes a configuration unit configured to allow the user of the system on a chip to define the initial configuration diagram and an allocation unit configured to implement the initial configuration diagram; and
wherein the allocation unit comprises, in addition to the first master manager piece of equipment:
a set of configuration registers assigned to each slave resource and to each master piece of equipment; and
a configuration controller configured to update contents of the sets of configuration registers with the set of configuration pieces of information under control of the first master manager piece of equipment.

18. The system on a chip according to claim 17,
wherein a set of configuration registers assigned to a slave resource is intended to store the configuration pieces of information assigned to the slave resource; and
wherein a set of configuration registers assigned to each master piece of equipment is intended to store the identification piece of information assigned to the master piece of equipment and the configuration pieces of information assigned to the master piece of equipment.

19. The system on a chip according to claim 7, wherein the processing unit is configured to execute a user program to modify the initial configuration diagram after its implementation and to implement the configuration diagram accordingly and modify again any old configuration diagram as needed.

20. The system on a chip according to claim 19,
wherein the processing unit comprises an installation unit including, from the master pieces of equipment, a first master manager piece of equipment, the first master manager piece of equipment being configured, in response to a first boot of the system on a chip, to perform a boot phase at an end of which the first master manager piece of equipment is configured to at least allow the implementation of the initial configuration diagram; and
wherein only the master piece of equipment which has a quality of master manager piece of equipment is configured to modify the configuration diagram.

21. The system on a chip according to claim 20,
wherein a set of configuration registers assigned to a slave resource is intended to store the configuration pieces of information assigned to the slave resource;
wherein a set of configuration registers assigned to each master piece of equipment is intended to store the identification piece of information assigned to the master piece of equipment and the configuration pieces of information assigned to the master piece of equipment; and
wherein in order to modify the configuration diagram, the first master manager piece of equipment is configured to control a configuration controller so that it updates contents of the configuration registers with the set of configuration pieces of information defining the modified configuration diagram to be implemented.

22. The system on a chip according to claim 1, wherein each transaction emitted by a respective master piece of equipment comprises an addressing field whose content is intended to address the slave resource receiving the transaction, and the content of the addressing field does not belong to the set of configuration pieces of information.

23. The system on a chip according to claim 1, wherein each transaction emitted by a respective master piece of equipment comprises an addressing field whose content is intended to address the slave resource receiving the transaction, and the processing unit further includes an addition unit configured to add to each transaction emitted by the respective master piece of equipment, at least the identification piece of information of the master piece of equipment, the identification piece of information not belonging to the addressing field of the transaction.

24. The system on a chip according to claim 23, wherein the addition unit includes for each master piece of equipment, an elementary management unit configured to access the identification piece of information assigned to the master piece of equipment and optionally a security piece of information and/or a privileged piece of information, and to add to any transaction emitted by the master piece of equipment, the identification piece of information and optionally the security piece of information and/or the privileged piece of information.

25. The system on a chip according to claim 24,
wherein a set of configuration registers assigned to a slave resource is intended to store the configuration pieces of information assigned to the slave resource;
wherein a set of configuration registers assigned to each master piece of equipment is intended to store the identification piece of information assigned to the master piece of equipment and the configuration pieces of information assigned to the master piece of equipment; and
wherein each elementary management unit assigned to a respective master piece of equipment is connected by a dedicated link at least to the set of configuration registers assigned to the master piece of equipment.

26. The system on a chip according to claim 1, wherein the system on a chip is a microcontroller or a microprocessor.

27. A system on a chip, comprising:
a plurality of master pieces of equipment;
a plurality of slave resources;
an interconnection circuit coupled between the master pieces of equipment and the slave resources and capable of routing transactions between master pieces of equipment and slave resources; and
a processing unit configured to:
  allow a user of the system on a chip to implement within the system on a chip at least one configuration diagram of the system defined by a set of configuration pieces of information including at least one piece of identification information assigned to each master piece of equipment, wherein the identification pieces of information are intended to be attached to all the transactions emitted by the corresponding master pieces of equipment, and wherein the set of the configuration pieces of information are not used for addressing the slave resources receiving the transactions and are used to define an assignment of at least one piece of master equipment to at least some of the slave resources; and
  allow the user of the system on a chip to implement within the system on a chip an initial configuration diagram forming the configuration diagram;
wherein the processing unit comprises an installation unit including, from the master pieces of equipment, a first master manager piece of equipment, wherein the first master manager piece of equipment is configured to, in response to a first boot of the system on a chip, perform a boot phase at an end of which the first master manager piece of equipment is configured to at least allow implementation of the initial configuration diagram;
wherein the set of configuration pieces of information defining the configuration diagram further comprises, for each master piece of equipment, in addition to its identification piece of information:
  a security piece of information intended to indicate whether the master piece of equipment is configured in secure mode or not; and
  a privileged piece of information intended to indicate whether the master piece of equipment is configured in privileged mode or not; and
wherein the first master manager piece of equipment is configured to be in secure mode and in privileged mode at the end of its boot phase.

28. A system on a chip, comprising:
a plurality of master pieces of equipment;
a plurality of slave resources;
an interconnection circuit coupled between the master pieces of equipment and the slave resources and capable of routing transactions between master pieces of equipment and slave resources; and
a processing unit configured to:
  allow a user of the system on a chip to implement within the system on a chip at least one configuration diagram of the system defined by a set of configuration pieces of information including at least one piece of identification information assigned to each master piece of equipment, wherein the identification pieces of information are intended to be attached to all the transactions emitted by the corresponding master pieces of equipment, and wherein the set of the configuration pieces of information are not used for addressing the slave resources receiving the transactions and are used to define an assignment of at least one piece of master equipment to at least some of the slave resources; and
  allow the user of the system on a chip to implement within the system on a chip an initial configuration diagram forming the configuration diagram;
wherein the processing unit comprises an installation unit including, from the master pieces of equipment, a first master manager piece of equipment, wherein the first master manager piece of equipment is configured to, in response to a first boot of the system on a chip, perform a boot phase at an end of which the first master manager piece of equipment is configured to at least allow implementation of the initial configuration diagram;
wherein the processing unit includes a configuration unit configured to allow the user of the system on a chip to define the initial configuration diagram, and an allocation unit configured to implement the initial configuration diagram; and
wherein the allocation unit comprises, in addition to the first master manager piece of equipment:
  a set of configuration registers assigned to each slave resource and to each master piece of equipment; and
  a configuration controller configured to update contents of the sets of configuration registers with the set of configuration pieces of information under control of the first master manager piece of equipment.

* * * * *

UNITED STATES PATENT AND TRADEMARK OFFICE
CERTIFICATE OF CORRECTION

PATENT NO. : 11,700,174 B2
APPLICATION NO. : 16/951198
DATED : July 11, 2023
INVENTOR(S) : Anquet et al.

It is certified that error appears in the above-identified patent and that said Letters Patent is hereby corrected as shown below:

On the Title Page

Item (72), in Column 1, in "Inventors", Line 2, delete "Pouillon" and insert -- Rouillon --.

Item (74), in Column 2, in "Attorney, Agent, or Firm", Line 1, delete "Matsl," and insert -- Matsil, --.

Signed and Sealed this
Twenty-sixth Day of September, 2023

*Katherine Kelly Vidal*

Katherine Kelly Vidal
*Director of the United States Patent and Trademark Office*